(12) United States Patent
Homma

(10) Patent No.: US 6,746,552 B2
(45) Date of Patent: Jun. 8, 2004

(54) SHAPE MEMORY ALLOY ACTUATOR AND METHOD OF DESIGNING THE SAME

(75) Inventor: Dai Homma, Yokohama (JP)

(73) Assignee: Toki Corporation Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/162,399

(22) Filed: Jun. 5, 2002

(65) Prior Publication Data

US 2003/0000605 A1 Jan. 2, 2003

(30) Foreign Application Priority Data

Jun. 22, 2001 (JP) ........................ 2001-189861

(51) Int. Cl.[7] .............................. C22C 19/03; C22K 1/00
(52) U.S. Cl. ........................................ 148/563; 148/402
(58) Field of Search ................................. 148/563, 402

(56) References Cited

U.S. PATENT DOCUMENTS

| | | | |
|---|---|---|---|
| 4,086,769 A | 5/1978 | Smith | 60/527 |
| 5,440,193 A * | 8/1995 | Barrett | 340/328 |
| 5,836,066 A * | 11/1998 | Ingram | 148/563 |
| 5,982,521 A * | 11/1999 | Bessho et al. | 359/198 |
| 6,053,992 A * | 4/2000 | Wu et al. | 148/402 |
| 6,371,463 B1 * | 4/2002 | Sorovshian | 310/239 |
| 6,596,102 B2 * | 7/2003 | Homma | 148/563 |
| 2002/0118090 A1 * | 8/2002 | Park et al. | 148/402 |
| 2003/0034711 A1 * | 2/2003 | Soroushian | 310/247 |
| 2003/0162048 A1 * | 8/2003 | Ho et al. | 428/610 |

FOREIGN PATENT DOCUMENTS

| | | |
|---|---|---|
| GB | 2 072 756 A | 10/1981 |
| JP | 58/035278 | 3/1983 |
| JP | 58/110865 | 7/1983 |

OTHER PUBLICATIONS

Jorma Ryhänen; "Biocompatibility evaluation of nickel–titanium memory metal alloy"; Oulu University Library; May 7, 1999; Academic Dissertation; Retrieved from the Internet.
Constantinos Mavroidis, Charles Pfeiffer and Michael Mosley; "Conventional Actuators, Shape Memory Alloys, and Electrorheological Fluids"; Automation, Miniature Robotics and Sensors for Non–Destructive Testing and Evaluation; Apr. 1999; Retrieved from the Internet.
Katsutoshi Kuribayashi; "A New Actuator of a Joint Mechanism Using TiNi Alloy Wire"; International Journal of Robotics Research, vol. 4, No. 4; Dec. 31, 1986; Sage Science Press, Thousand Oaks, US.

* cited by examiner

Primary Examiner—George Wyszomierski
(74) Attorney, Agent, or Firm—Birch, Stewart, Kolasch & Birch, LLP

(57) ABSTRACT

The present invention employs a shape memory alloy that exhibits a two-way shape memory effect and that has a stress-strain property that, in a stress-strain diagram, the stress-strain curve comprises a gentler gradient portion extending with relatively small gradients and a steeper gradient portion extending with relatively great gradients. The shape memory alloy is operated in the region surrounded by the gentler gradient portion, the steeper gradient portion, a practical stress limit line, a straight line connecting the intersection of the practical stress limit line and a strain limit line near shape recovery completion on which the strain of the shape memory alloy reaches a specified value in a state close to the shape recovery completion and the point where the strain is zero at a low temperature in the stress-strain diagram.

23 Claims, 13 Drawing Sheets

US 6,746,552 B2

SHAPE MEMORY ALLOY ACTUATOR AND METHOD OF DESIGNING THE SAME

BACKGROUND OF THE INVENTION

1. Field of the Invention

This invention relates to a shape memory alloy actuator utilizing a shape restoring force of a shape memory alloy (SMA) and a method of designing the same.

2. Related Art

Generally, in conventional shape memory alloy actuators, their shape memory alloys tends to lose the memory of the given configuration, and permanent strains tend to be produced in the alloy in a short period of time. Therefore, the conventional shape memory alloy actuators have short lives and unstable performances, and their shape memory alloys are unstable in configuration. Besides, they utilize only a very limited range of recoverable strains of the shape memory alloys and thereby their operating ranges are limited.

SUMMARY OF THE INVENTION

It is accordingly an object of the present invention to provide a shape memory alloy actuator that withstands a large number of operation cycles and has a far longer service life than the conventional shape memory alloy actuators and a method of designing such a shape memory alloy actuator.

It is another object of the present invention to provide a shape memory alloy actuator that is stable in configuration of its shape memory alloy and a method of designing such a shape memory alloy actuator.

It is still another object of the present invention to provide a shape memory alloy actuator that is stable in performance and a method of designing such a shape memory alloy actuator.

It is a further object of the present invention to provide a shape memory alloy actuator that can effectively utilize almost the whole range of recoverable strain of its shape memory alloy and has a far wider operating range than the conventional shape memory alloy actuators and a method of designing such a shape memory alloy actuator.

It is a still further object of the present invention to provide a shape memory alloy actuator with respect to which the required amount of shape memory alloy can be estimated very easily and a method of designing such a shape memory alloy actuator.

The present invention employs a shape memory alloy exhibiting a two-way shape memory effect and having a stress-strain property that, in a stress-strain diagram with the stress plotted in ordinate, the upward direction taken as the positive direction, and the strain plotted in abscissa, the rightward direction taken as the positive direction, the stress-strain curve at a low temperature comprises a gentler gradient portion extending from the position at which the strain is zero to the right with relatively small gradients, in the area in which the stress is negative or approximately along the line on which the stress is zero, and a steeper gradient portion extending upward to the right with relatively great gradients on the right of said gentler portion. The present invention operates the shape memory alloy in the region surrounded by the gentler gradient portion, the steeper gradient portion, a practical stress limit line on which the stress in the shape memory alloy reaches a specified practical limit, the straight line connecting the intersection of the practical stress limit line and a strain limit line near shape recovery completion on which the strain of the shape memory alloy reaches a specified value in a state close to the shape recovery completion and the point where the strain is zero at a low temperature in the stress-strain diagram.

BRIEF DESCRIPTION OF THE DRAWINGS

The foregoing and the other objects, features and advantages of the present invention will become apparent from the following detailed description when taken in connection with the accompanying drawings. It is to be understood that the drawings are designated for the purpose of illustration only and are not intended as defining the limits of the invention.

DETAILED DESCRIPTION OF THE INVENTION

Theoretical Discussion

Figure 1:
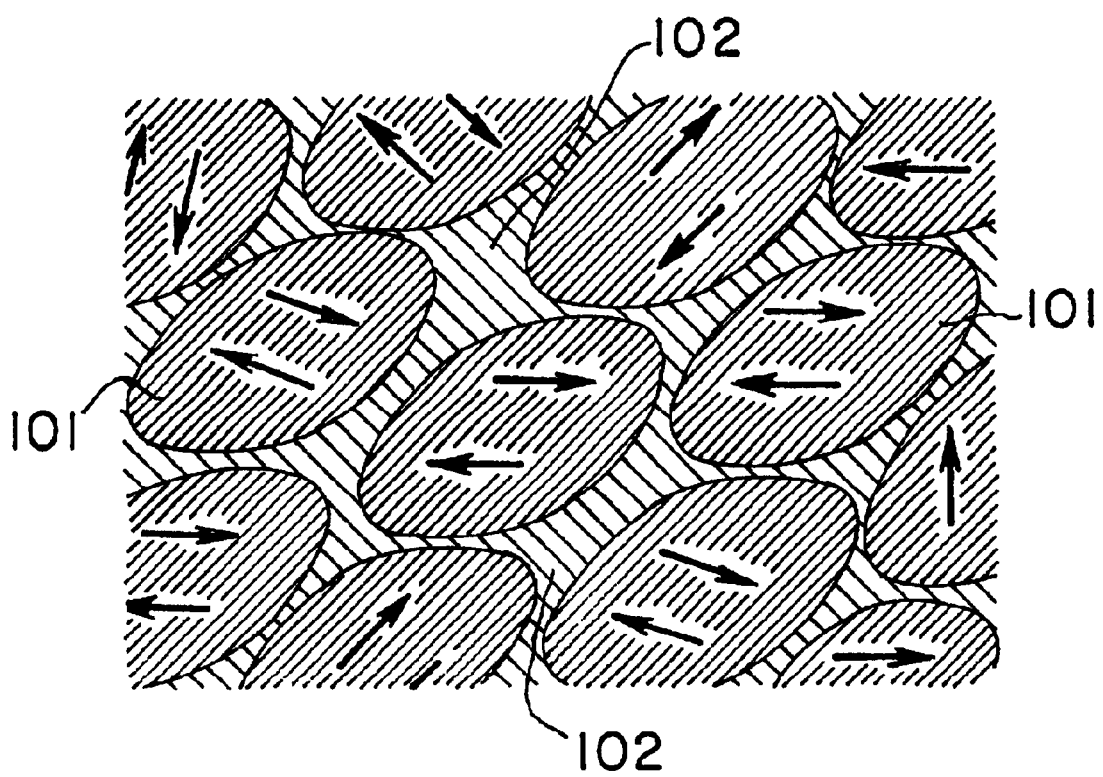
FIG. 1 is a schematic presentation of metallographic structure of a shape memory alloy.

In order to facilitate the understanding of the present invention, a theoretical discussion will be made hereunder.

First, general problems of shape memory alloys that are not known widely will be discussed. Generally, shape memory alloys are polycrystalline substances and, from the point of view of extracting maximum movement from shape memory alloys, it is sufficient to fully anneal them to increase the sizes of their crystals and then impart a large deformation to them. For instance, in the case of a Ti—Ni based shape memory alloy, annealing it at a temperature of about 900° C. for a few to several tens minutes can obtain a metal structure with such great crystals. Such metal structure is soft and it is easy to impart a large deformation to it. However, since orientations and sizes of its crystals are random and thereby some parts in the interior of the alloy material cannot follow the large deformation, large shape recovery can be repeated to some extent as long as no load stress is applied thereto, but in the case where large shape recovery is repeated under loaded condition, a permanent deformation such as droop and elongation occurs easily and sufficient restoration to the original shape can hardly be attained. Besides, microscopic plastic deformations are accumulated gradually in the interior of the alloy material to become obstacles to the deformations, and thereby the recoverable strain, that is, the strain that can be extracted from the shape memory alloy as a motion (hereinafter referred as operational strain) becomes smaller. Thus, a large operational strain can be utilized only a limited number of times.

In the case of shape memory alloys and superelasticity materials for practical use, they are often adjusted, by adjusting the degree of severe cold working and annealing, to have a mixture of a solid and stout structure produced by work hardening and crystals dispersed randomly in which the shape memory effect easily occurs. With this arrangement, the part produced by work hardening maintains the configuration of the alloy as if it were strong fibers, while crystals surrounded by the aforesaid part have charge of a large deformation produced by the shape memory effect or superelastic deformation. Besides work hardening, in some cases, depositions of impurities are utilized to attain the stability in shape. In the case of such materials, a stable condition can be attained in a short period of time, though the operational strain is small, and such materials exhibit properties similar to those of the aforesaid materials that are obtained by repeatedly operating shape memory alloys, which have been fully annealed and move well, though unstable, a large number of times till they settle into a stable condition. For industrial purposes, such stable materials are easier to handle, though the operational strain thereof is small. However, it should be noted that they do not exhibit the abilities as shape memory alloys to the fullest.

It may be natural to think that the shape restoring force of a shape memory alloy generated upon heating exceeds the strength of the alloy material itself. In other words, the critical load stress to a shape memory alloy above which a permanent deformation is produced therein is smaller than the shape restoring force thereof. Such properties of shape memory alloys, though not known widely, are the biggest cause to make practical applications of shape memory alloy actuators difficult; erroneous mechanism designs cannot attain durable shape memory alloy actuators. For instance, when a commonly used shape memory alloy is heated while being constrained with a pre-deformation of tensile strain that exceeds 1%, the shape restoring force generated therein exceeds the fatigue strength and the elastic limit thereof and is large enough to worsen their own properties. For applications where the shape memory alloy is operated repeatedly, it seems that, even with a strain less than above, depending on the manner of heating the alloy, a strong shape restoring force of the alloy may destroy the structure locally in the interior of the alloy material, and this becomes a big factor to make the alloy unstable in shape and properties. Though, as was stated previously, the shape stability for a large external force of the shape memory alloy can be improved to some extent by work hardening the alloy, it sacrifices most parts of the alloy that are capable of exhibiting the shape memory effect, and consequently a large operational strain cannot be available. At present, even Ti—Ni based shape memory alloys, which essentially have large shape recovery, are obliged to have limited operational strains and, in most cases, are used in the form of a coil spring to amplify the strains, covering smallness of the strains. In these cases, when the shape memory alloys are cold-worked into the coil-shape, the strength of the alloys increases due to the work-hardening and the crystals of the alloys come to generate a smaller shape restoring force when heated, as long as the pre-strain imparted to the alloy is small.

The present inventor thinks the reason why the above-mentioned phenomena relating to the conventional shape memory alloys occur is as follows. Generally a shape memory alloy is polycrystalline as shown in a schematic illustration of FIG. 1 and its crystal grains (the interior of crystals) 101 can recover their shapes even when they are subjected to a large deformation because they are in a superelastic condition (the arrows in each crystal grain 101 represent a shearing direction in which a large deformation can occur due to superelasticity). However, the crystal grain boundaries 102 have structural inconsistencies and defects since they bond adjacent crystals having different orientations of deformation, and it is considered that they do not have properties like those of superelastic materials, unlike the crystal grains, but have properties similar to those of ordinary materials, though they are similar to the crystal grains in composition. Thus, when the shape memory alloy is restrained with a huge deformation, since the shape restoring force the deformed crystal grains generate due to the shape memory effect is larger than the strength of the crystal grain boundaries, it is considered that the crystal grain boundaries are selectively destroyed, that is, they suffer a plastic deformation or are broken. Besides, in the neighborhood of the completion point of shape recovery, even when the shape memory alloy is subjected to a comparatively small stress, most of the crystals are in a state where they have completed shape recovery to the fullest extent, and accordingly there is a possibility that the crystal grain boundaries are subjected to a large force and broken partly. Though such slight internal structure destructions that are produced mainly at the crystal grain boundaries in the full shape recovery state are inconspicuous while the operation cycle number is small, they cause serious problems when a long service life of 100,000 or more operation cycles is required of a shape memory alloy actuator. Most of conventional shape memory alloy actuators in the actual use are used as a temperature-sensitive element that works in response to ambient temperature and there are few cases where the operation cycle number far exceeding 100,000 with a large operational strain is expected. Also, there are few cases where the shape memory alloy is heated until it completes the shape recovery under loaded condition, as discussed above. These may be major reasons why the above-mentioned problems have not been noticed well so far. However, in the case of shape memory alloy actuators of the type in which their shape memory alloys are driven by an electric current passed therethrough, such problems become very serious, because their shape memory alloys are prone to be overheated frequently, and the actuators, as commercial products, compete with motors and solenoids and accordingly a long service life and a large operational strain are required of the actuators.

On the other hand, the present inventor proposed in U.S. patent application Ser. No. 09/871,619 a shape memory alloy being polycrystalline and having a substantially uniformly fine-grained crystal structure, crystal orientations thereof being arranged substantially along a direction suitable for an expected operational direction, and an alloy treating method for obtaining such a shape memory alloy. The term "expected operational direction" as herein used means a direction such as a tensile, torsion or bending direction or the like in which the shape memory alloy is expected to move when used in an actuator. For example, when a shape memory alloy in the form of a wire is used in a contraction-relaxation fashion, the expected operational direction is a tensile direction, while when a shape memory alloy in the form of a coil spring is used, the expected operational direction is a torsion direction. (A coil-spring-shaped memory alloy performs a shape recovery from a torsion and bending deformation when heated. Therefore, strictly speaking, it may be said that the expected operational direction in this case is a torsion and bending direction. However, the substantial expected operational direction is a torsion direction, because the bending deformation comprises a negligible percentage.) This shape memory alloy proposed by the present inventor exhibits a huge two-way shape memory effect.

In general, the two-way shape memory effect is a phenomenon that a shape memory alloy recovers the original configuration upon heating and deforms into another configuration upon cooling. That is, the shape memory alloy repeats change in shape by itself only by being heated and cooled in the absence of a biasing force from outside thereto. Apparently, it appears that the shape memory alloy remembers two configurations, the deformed configuration at a low temperature (the configuration in the martensitic state) and the recovered configuration at a high temperature (the configuration in the parent phase). A shape memory alloy that exhibits such a phenomenon is generally called the two-way shape memory alloy. According to literature, etc., it has been thought that, generally the two-way shape memory effect is a phenomenon observed only within the range in which a strain $\epsilon$ is 1% or less in tensile strain equivalent and it is difficult to put it to practical use since it is unstable. In fact, hitherto devices utilizing the two-way shape memory effect for practical purposes have been hardly found.

According to the shape memory alloy proposed by the present inventor, however, it is possible to cause a huge two-way shape memory effect over almost the whole range in which the shape memory effect occurs, namely, the whole range of recoverable strain (in most cases the two-way shape memory effect with a strain of 5% or more can be realized even in the absence of a load). For instance, in the case where the shape memory alloy is in the form of a wire and the deformed configuration (length) thereof at a low temperature is a configuration stretched from the original configuration (length), the shape memory alloy contracts to the original length thereof and becomes hard upon heating, while it expands by itself to the deformed length and becomes soft, in much the same manner that a muscle relaxes, upon cooling, even in the absence of a load. Moreover, such a huge two-way shape memory effect appears stably over about one hundred million cycles in the absence of a load.

The present invention is suitable for two-way shape memory alloys that exhibit such a huge two-way shape memory effect. It is considered that the present invention also can be applied to two-way shape memory alloys other than that proposed by the present inventor, as long as they exhibit a huge two-way shape memory effect with a strain reaching several percent as is the case with that proposed by the present inventor, if such will be developed in future or have already been developed. The shape memory alloy actuator and method of designing the same according to the present invention fundamentally differ from conventional ones utilizing a small strain range around 1%, at the most. Besides, though in most of conventional applications of the two-way shape memory effect, a reciprocating motion is realized only by a shape memory alloy, the present invention is suitable for an actuator in which a two-way shape memory alloy is used in combination with biasing means that is not a shape memory alloy or in which two shape memory alloys performing motions in opposite directions with each other are used in combination. The present invention is premised on use of a two-way shape memory alloy exhibiting a huge two-way shape memory effect and is not suitable for actuators using the ordinary one-way shape memory alloy or the conventional two-way shape memory alloy exhibiting a small and unstable two-way shape memory effect with a strain around 1% in tensile strain equivalent at the most. The conventional two-way shape memory alloy is fundamentally different from that the present invention concerns with, since, as was stated previously, it is produced by forming a strong stress field due to a high level of plastic working or precipitation of impurities in the interior of the alloy material.

By the way, in this specification, "two-way shape memory alloy" in the present invention includes shape memory alloys that do not exhibit a perfect two-way shape memory effect but require little force to be deformed within the range of recoverable strain at low temperatures. For example, if an extension coil spring is formed of a shape memory alloy that exhibits a perfect two-way shape memory effect, the extension coil spring would be hard to deal with as a product since it is expanded to its full length in its stable state at low temperatures. Therefore, there are some cases where it is better to prepare a shape memory alloy such that the stress in the interior thereof at low temperatures gets as close to zero as possible and not becomes negative (the negative stress will be discussed later in conjunction with FIG. 3); such an alloy can be obtained using the same kind of treating method as for the alloy exhibiting a perfect two-way shape memory effect. Such an alloy has a stress-strain curve that is much the same in shape to that of the alloy exhibiting a perfect two-way shape memory effect and a force required to deform it at low temperatures is close to zero over a huge recoverable strain range, because it has metallographic structure similar to that of the alloy exhibiting a perfect two-way shape memory effect.

Though in the case of functional materials such as shape memory alloys, their properties alone are apt to occupy the attention, it should be noted that, in order to put them into practical use, developments and improvements of methods for using them, as well as material improvements of them, are more important. If some practical applications come out, even though they are less than perfect, it makes properties required for the functional materials clearer and the material improvements are accelerated. Thus, materials and their applications are closely connected with each other. The present invention proposes a new method for using shape memory alloys having new properties.

Figure 2:
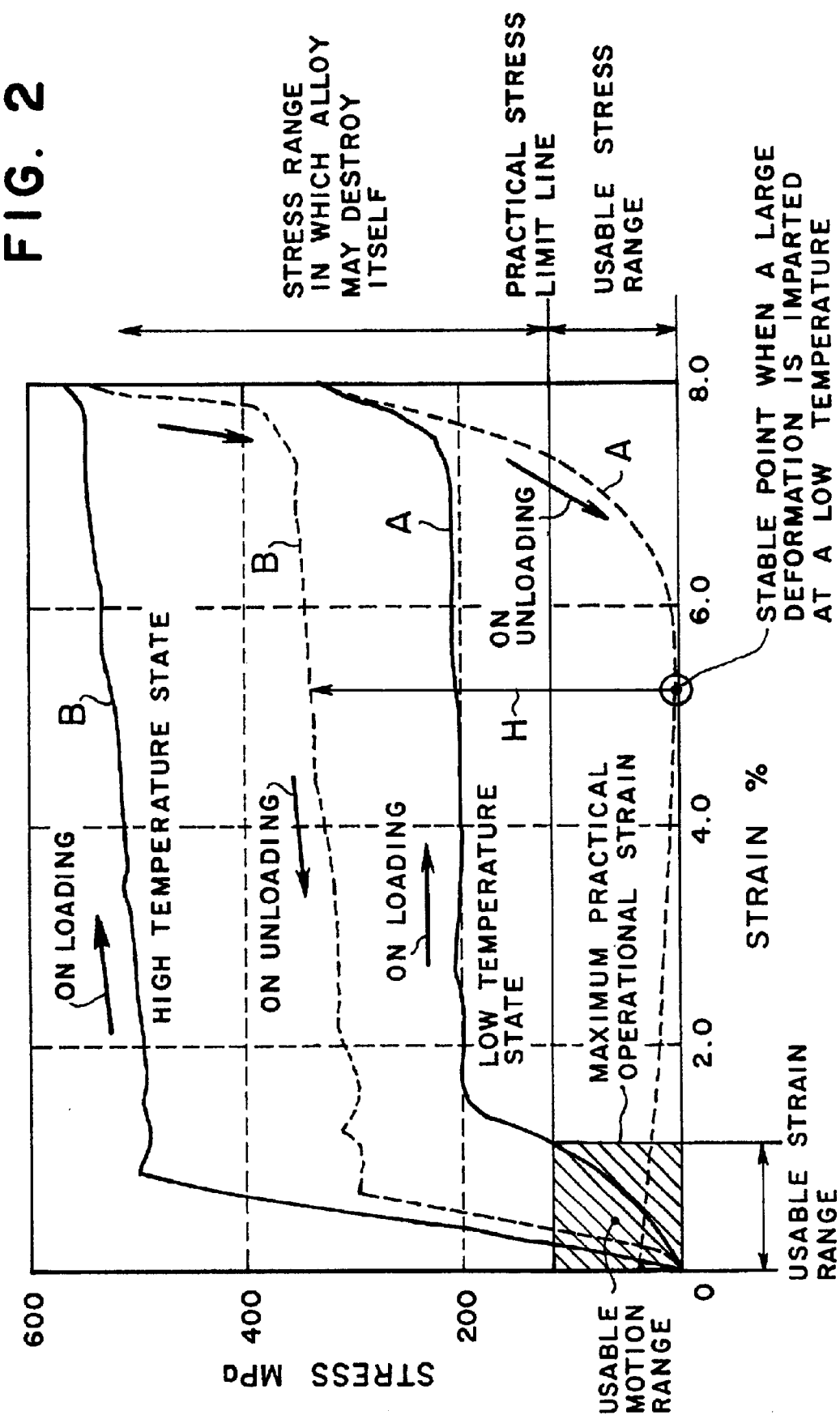
FIG. 2 is a presentation of a typical stress-strain diagram of a conventional Ti—Ni based shape memory alloy.

A stress-strain diagram (σ-ε diagram) of a standard material that is obtained by annealing a typical conventional shape memory alloy is shown in FIG. 2. The shape memory alloy exhibits the stress-strain curve shown with the line A in FIG. 2, when deformed at a low temperature below $M_f$. The solid line represents the process on loading, while the broken line represents the process on unloading. Apparently, the diagram has a configuration similar to those of common metals such as iron, the stress increases rapidly from around the strain of 6 to 7% and the alloy is finally broken off. The reason why is as follows. The bonds between the neighboring atoms of the shape memory alloy are like links having joints, and the alloy is deformed with a small force at first, but since the range in which the atoms can move easily is limited, further deformation does not occur without destruction of the links. The shape memory alloy once deformed at a low temperature scarcely recovers from the deformation, even if the stress is removed, as long as it is maintained at the low temperature. The same shape memory alloy exhibits the stress-strain curve as shown with the line B in FIG. 2, when it is subject to a tension test at a high temperature above $A_f$. The solid line represents the process on loading, while the broken line represents the process on unloading. The diagram resembles that at a low temperature in having a portion extending laterally and the lengths of the portions, but much grater stress is required to deform the alloy than at low a temperature. When the load is relieved gradually, the deformation is recovered along a path situated below the path along which the alloy is deformed at first. When the shape memory alloy is heated after deformed at a low temperature, it reverts to the original configuration along the path H and the recovering path referred to above. However, as such large deformations are repeated, the origin point and the shapes of the diagrams undergo changes. The reason for this is that the interior of the alloy material is changed. Generally, shape memory alloys have been used in the range in which such change does not occur by keeping the deformations small empirically. The limit of the deformations is, as was stated previously, the amount of the deformation for which the crystal grains produces a shape restoring force not exceeding the strength of the grain boundaries, and is considered as about 1% at the most in tensile strain equivalent. The conventional design method of a shape memory alloy actuator utilizes the difference between the stress-strain relations at low and high temperatures and can be applied only to a very limited range around the origin of FIG. 2. Though generally there are various restrictions in designing a shape memory alloy, utmost attention should be called to the fact mentioned previously that the shape memory alloy destroys itself with its shape restoring force produced at high temperatures when heated under restrain with a large deformation imparted thereto or while subjected to a great force.

According to the experiences of the inventor, most people are sensitive about motions and size changes of a shape memory alloy but have little interest in controlling forces generated in the alloy. This is considered to be the reason why they treat a shape memory alloy just like a spring made of an ordinary material, resulting in deteriorated performance and shortened service life of the alloy, without their knowing. In the case of the conventional shape memory alloy, the shape restoring force and the biasing force cannot be fully utilized. These characteristics of a shape memory alloy are the principal reason why the design of a shape memory alloy actuator is difficult; an erroneous mechanism design cannot attain a durable actuator. Particularly an actuator of the so-called differential type, having a pair of shape memory alloys so as to be operated complementarily, is apt to fall into a state in which the two shape memory alloys are heated at the same time and pull each other. This situation not only prevents the actuator from performing movement properly but also tends to cause the deterioration of the shape memory alloys as stated previously, which makes it difficult to put the actuator into practical use. The critical degree of deformation that affects the practical service life of the shape memory alloy is considered to be fairly smaller than the limit mentioned previously. According to the experiences of the inventor, if the operation is expected to be repeated 100,000 cycles or more, in the case of a Ti—Ni based shape memory alloy, for instance, the alloy may be elongated or break down during use unless the sum of the external force and the force applied to the alloy by an element constituting the actuator such as a biasing spring is limited to 100 MPa or a little above in tensile stress equivalent. 100,000 cycles are a standard for service lives of commonly used consumer products. This upper limit of the stress is represented by the horizontal line named "practical stress limit line" in FIG. 2. In practice, the shape memory alloy can be used repeatedly only with the stress below this line.

For the conventional Ti—Ni based shape memory alloy at a low temperatures, the deformation that can be imparted with such a level of stress is about 1% at most in tensile strain equivalent. In the case of the conventional Ti—Ni based shape memory alloy, the force required to deform it at low temperatures exceeds the practical stress limit line over a wide range of the recoverable strain. Therefore, even if the shape memory alloy is used in a manner not to be subjected to an external force, the interior of the alloy material changes gradually, as large deformations and shape recoveries are repeated. Accordingly, it is difficult to fabricate an actuator that stably repeats a reciprocating motion by using a range of large deformations exceeding the practical stress limit line. Thus, in most cases of actuators using the conventional shape memory alloy that perform a cycle movement, the shape memory alloy is processed into a blade spring, coil spring or the like and is used in a narrow strain range by keeping its strain small or by imparting a high level of work hardening to it lest the shape recovery stress generated in it should become large, trading off movement for strength. Close observation of most shape memory alloy actuators that are already in practical use reveals that their shape memory alloys are operated with strains as small as those of springs formed of ordinary materials such as iron, stainless steel and the like. The formulas or the like for designing shape memory alloy coil springs that have been published in various literatures are those which are applicable only in a narrow range within the elastic limit; and it is a fact that most applications work in such a limited range. As compared with the range in which the material itself can recover the configuration, the operational strain and the load stress actually available without causing the instability and shortening of the service life are very limited. In the design of the conventional shape memory alloy actuator, a designer must struggle against a complicated stress-strain diagram like FIG. 2 in a very limited range around the origin thereof. It is needless to say that strict quality control and precise design are necessary since the strains to be treated are small.

Figure 3:
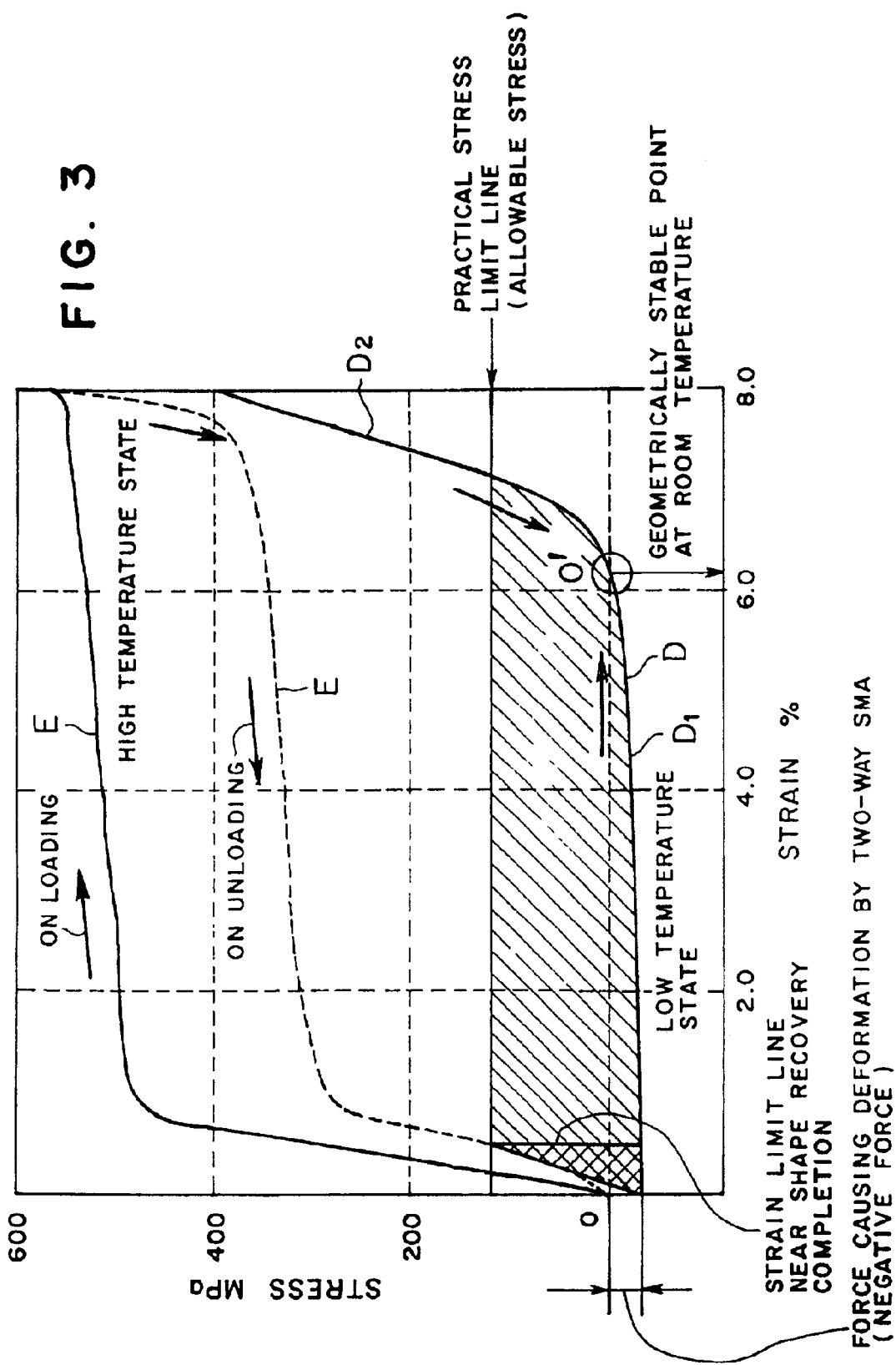
FIG. 3 is a presentation of a typical stress-strain diagram of a two-way shape memory alloy exhibiting a huge two-way shape memory effect.

FIG. 3 is a typical stress-strain diagram (force-displacement diagram) of a shape memory alloy that exhibits a huge two-way shape memory effect and with which the present invention is concerned, hereafter referred to simply as "two-way shape memory alloy", unless otherwise indicated. The origin of the diagram is the position at which the shape memory alloy has restored (contracted) to the original configuration (length) when heated. The line D represents the stress-strain curve at a low temperature below $M_f$ point. The line E represents the stress-strain curve at a high temperature above $A_f$ point (the solid line represents the process on loading, while the broken line represents the process on unloading). In the case of the conventional shape memory alloy, when it is cooled to a low temperature after the recovery to its original configuration upon heating, it maintains its original configuration, and therefore the origin of the deformation at high temperatures almost coincides with that at low temperatures. On the other hand, the two-way shape memory alloy, when cooled, gets into a state corresponding to the deformed state (expanded state) of the conventional shape memory alloy and the internal stress therein becomes negative or zero, and thereby in reality the alloy becomes stable in shape at the point O' at which the stress becomes zero in FIG. 3. However, here for the purpose of comparison with the stress-strain curve of the conventional shape memory alloy of FIG. 2, FIG. 3 is shown as the point of origin being placed at the position where the alloy completes contraction, namely, the shape recovery, when heated, for convenience's sake. There is no distinct difference in the shapes of the stress-strain curves at a high temperature between the two-way shape memory alloy and the conventional shape memory alloy, but in the stress-strain curve at a low temperature of the two-way shape memory alloy the stress appears in the negative direction. Because of the negative stress, the alloy is deformed (relaxes and is expanded) to the point O' in FIG. 3 without the application of a force.

Basically, the two-way shape memory relating to the present invention has a stress-strain property that, in the stress-strain diagram, the stress-strain curve D at a low temperature comprises a gentler gradient portion $D_1$ that extends from the position at which the strain is zero to the right with relatively small gradients in the area in which the stress is negative and a steeper gradient portion $D_2$ that extends upward to the right with a relatively great gradients on the right of the gentler portion $D_1$. However, as previously discussed, the present invention also deals with shape memory alloys that do not exhibit a perfect two-way shape memory effect but require little force to be deformed within the range of recoverable strain at low temperatures, and in the case of such alloys the gentler gradient portion $D_1$ extends from the position at which the strain is zero to the right approximately along the line on which the stress is zero.

A method for designing a shape memory alloy actuator according to the present invention will be more specifically described below. First, a limit is placed on the stress, since the two-way shape memory alloy is damaged, if it is heated while being restrained, as is the case with the conventional shape memory alloy. That is, the shape memory alloy shall be operated below the horizontal line, namely, practical stress limit line in FIG. 3. The stress value of the practical stress limit line is almost the same as that of the practical stress limit line for the conventional shape memory alloy shown in FIG. 2. However, in the case of the two-way shape memory alloy, since no force or little force is required to deform it at low temperatures, the region of the usable strains is a wide one that is bordered by the rising of the stress-strain curve and the practical stress limit line. In the present invention the specific value of the limit of the stress can be determined according to the required service life of the actuator.

Figure 5:
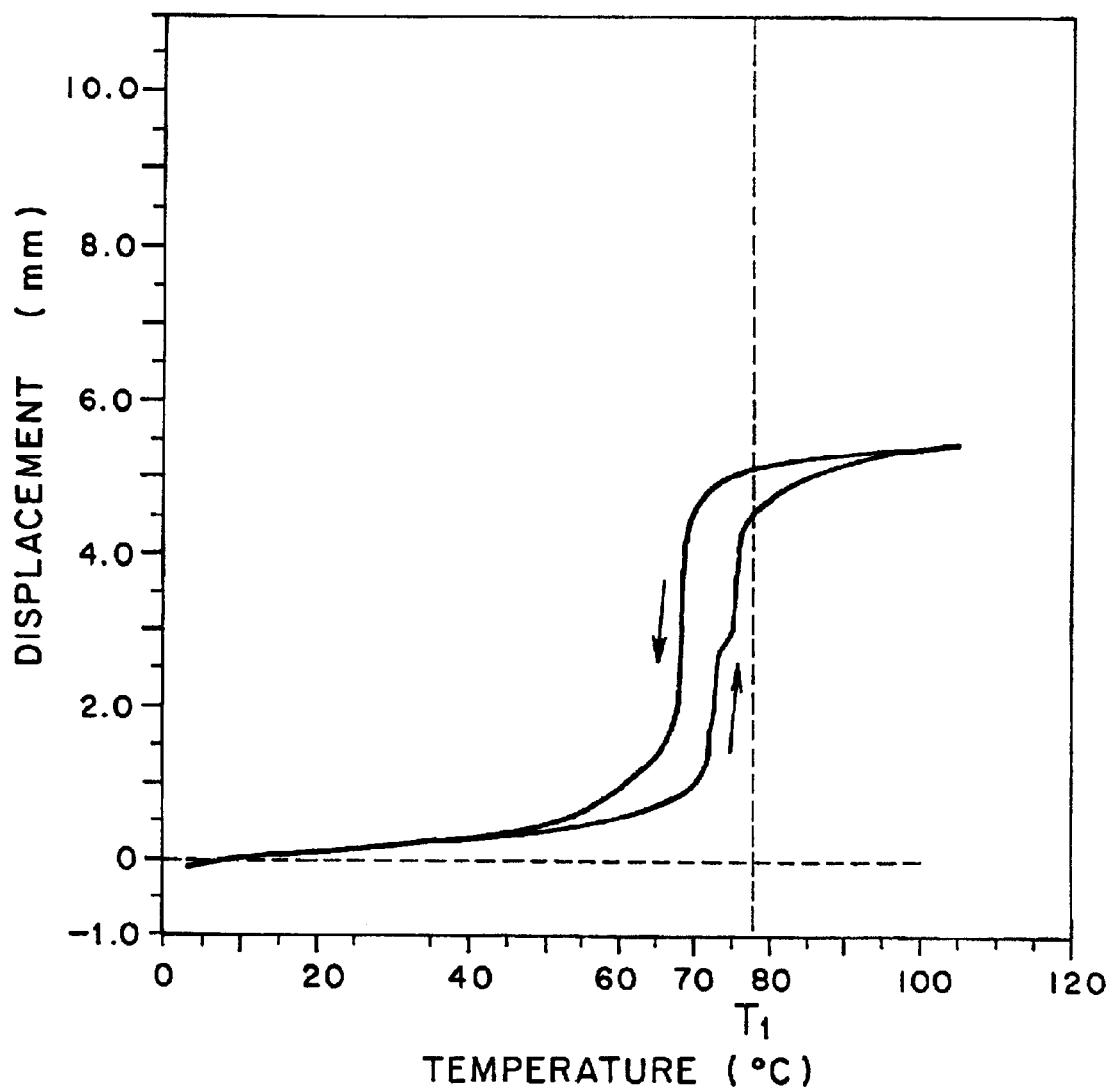
FIG. 5 is a presentation of a typical temperature-strain diagram of a two-way shape memory alloy exhibiting a huge two-way shape memory effect.
Figure 6:
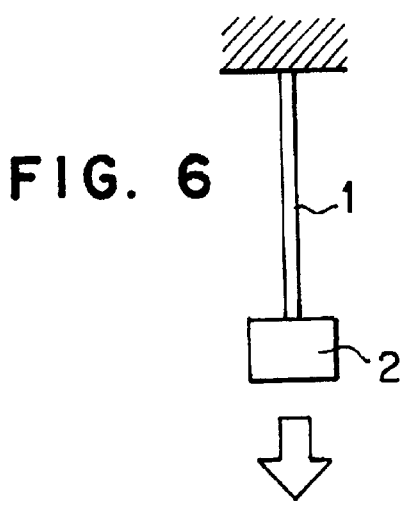
FIG. 6 is schematic diagram showing measurement conditions for the temperature-strain diagram of FIG. 5.

Next, a limit is placed on the operational strain immediately to the right of the strain region the shape memory alloy reaches upon completion of the shape recovery when heated enough. That is, in order to prevent the self-destruction in the interior of the alloy material that proceeds gradually as was stated previously from occurring, a line called "strain limit line near shape recovery completion", which is a vertical straight line on which the strain is constant, is established near the position at which the shape recovery of the shape memory alloy is completed, and, basically, to the left of the line the operation of the alloy is prohibited. Here this prohibited region almost coincides with the range of usable strains that is established in the design for the conventional shape memory alloy referred previously. That is, the region in which the shape memory alloy is usable in the design for the conventional shape memory alloy (the area shadowed with slanted lines in the same direction in FIG. 2) is a region in which use of the shape memory alloy is prohibited in the design method of the present invention. In other words, the design method of the present invention is a method that uses principally the range of strains that is not used in the conventional shape memory alloy actuator. As shown in FIG. 5, a measure of setting a specific value for the strain limit line near shape recovery completion is the point (the point at the temperature $T_1$) at which the gradient of the curve upon heating decreases rapidly in a temperature-strain diagram of the shape memory alloy. It was confirmed by experiments of the inventor that the self-destruction of the shape memory alloy tends to start, when the shape recovery is allowed to proceed beyond the point. FIG. 6 shows the measurement conditions for the temperature-strain diagram of FIG. 5, in which the measurement is performed with a weight 2 suspended by a shape memory alloy 1 in the form of a wire. In this case, the stress is set to 100 MPa. It should be noted that the axis of ordinates is established so that the displacement of zero denotes the stable state of the shape memory alloy at a low temperature and the displacement increases as the shape recovery proceeds by heating.

Thus, in the present invention, basically the region in which the shape memory alloy is operated shall be the area shadowed with slanted lines in the same direction in the stress-strain diagram (force-displacement diagram) of FIG. 3. Using the shape memory alloy in such a region makes it possible to use almost the whole range of the shape memory strain effectively and to achieve a shape memory alloy actuator having a quite a long service life without causing the self-destruction of the alloy that leads to loss of shape memory and degradation in performance. However, in addition to the area shadowed with slanted lines in the same direction, there is a possibility that the crosshatched region in FIG. 3 (the area surrounded by the gentler gradient portion $D_1$, the strain limit line near shape recovery completion and the straight line connecting the intersection of the practical stress limit line and the strain limit line near shape recovery completion and the point where the strain is zero at a low temperature in the stress-strain diagram) also can be used, since the self-destruction of the shape memory alloy can be prevented from occurring there as long as the stress is kept sufficiently small or the shape recovery is not allowed to be completed.

Figure 4:
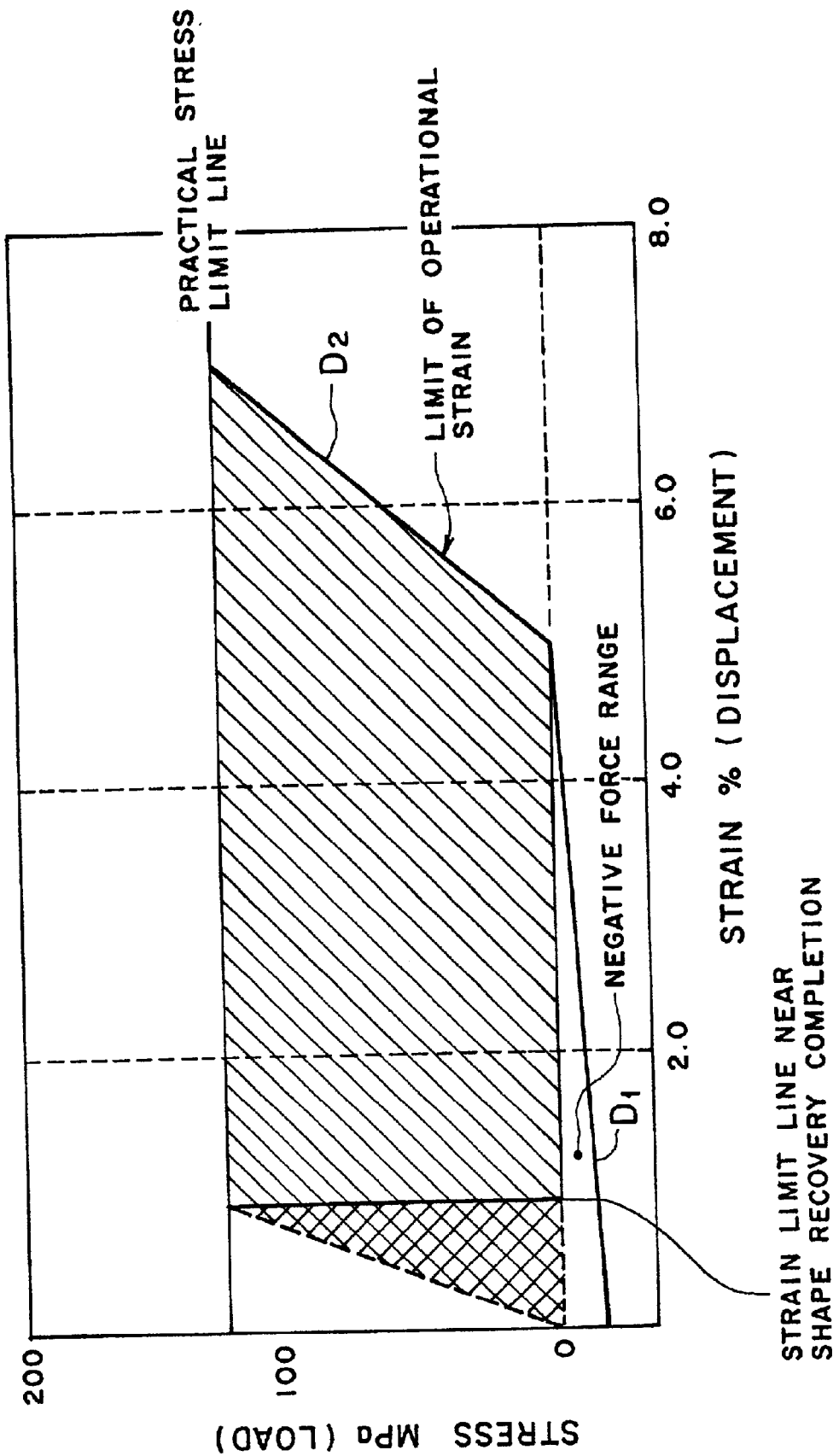
FIG. 4 is a simplified diagram of FIG. 3.

FIG. 4 shows the region in which the shape memory should be operated in a simplified form, in order to make the actuator design method in accordance with the present invention more practical. That is, the region shadowed with slanted lines in the same direction in FIG. 3, in which the shape memory alloy should be used, is simplified and considered as the quadrangular region surrounded by the line on which the stress is zero, a straight line by which the steeper gradient portion $D_2$ is approximated, the practical stress limit line and the strain limit line near shape recovery completion, which is also shadowed with slanted lines in the same direction in the drawing. In addition to such a region, there is a possibility that the crosshatched region in FIG. 4 (the area surrounded by the line on which the stress is zero, the strain limit line near shape recovery completion, and the straight line connecting the intersection of the practical stress limit line and the strain limit line near shape recovery completion and the origin point of the diagram), if the stress is kept sufficiently small or the shape recovery is not allowed to be completed. In FIG. 4 the gentler gradient portion $D_1$ is also approximated by a straight line.

Figure 19:
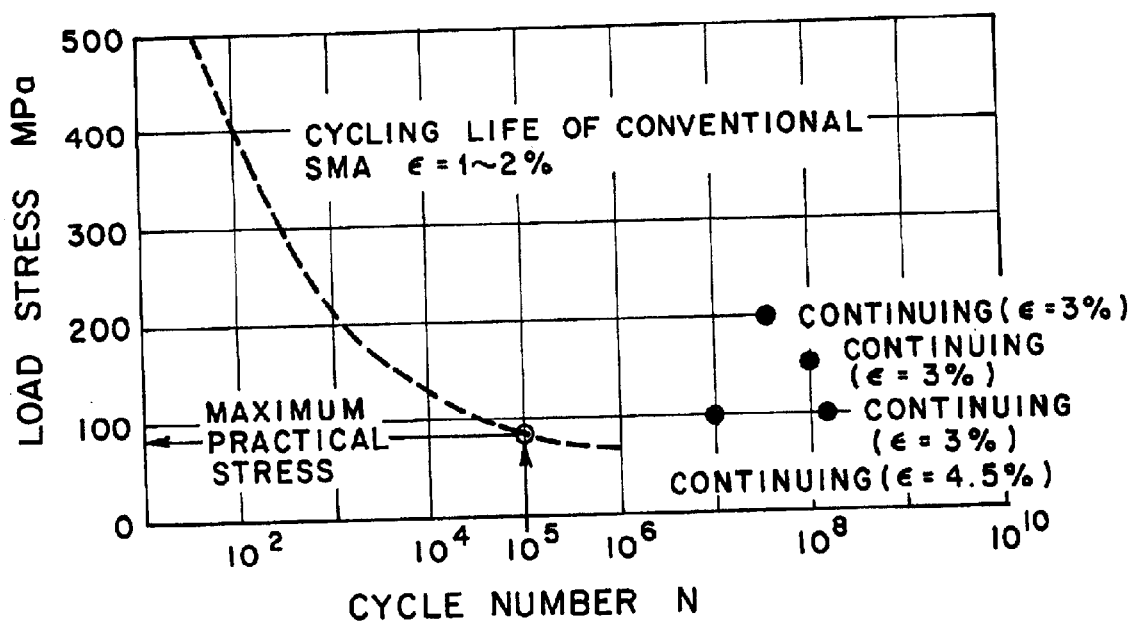
FIG. 19 is a graph showing the results of cycling life tests obtained so far (the tests are still continuing) for actuator models designed by the design method of the present invention, along with the service life of the typical conventional shape memory alloy.

Such simplification of the diagram eliminates the need for studying the detailed stress-strain diagram. In other words, we assume that at high temperatures the force and displacement available follow the practical stress limit line, whereas at low temperatures follow the line of stress zero that passes through the origin point (the point at which the stress and the strain are zero). Simplifying the mechanical properties of the two-way shape memory alloy down to such a simple diagram facilitates the actuator design and increases the degree of freedom therein FIG. 19 shows results of cycling life tests so far, which are still continuing, for actuator models designed by the design method of the present invention (they are still operating normally), where the black dots represent cycle numbers at present for the actuators according to the present invention; the cycling life of a typical conventional shape memory alloy is also shown as a curve depicted with a broken line for comparison purposes. The actuator with the load stress of 100 MPa and the operational strain $\epsilon$ of 3% in tension has been repeating movements over one hundred and thirty million cycles, and that with the load stress of the same magnitude and the operational strain 68 of 4% in tension has been repeating movements over nine million cycles, without causing any troubles such as a rupture of the shape memory alloy.

Since little change is observed in physical properties of the shape memory alloy such as the range of the operational strain and the electric resistance, it is considered that plastic strains has been neither produced or developed in the interior of the alloy and that the alloy is in motion under an extremely stable condition. Those performances of the shape memory alloy actuators in accordance with the present invention are remarkable, considering the fact that it is difficult for the conventional shape memory alloy actuator with the load stress of 100 MPa and the operational strain of 2% to repeat movements over one hundred thousand cycles stably.

DETAILS OF THE EMBODIMENTS

Embodiments of the present invention will now be described hereunder with reference to the accompanying drawings.

Figure 7:
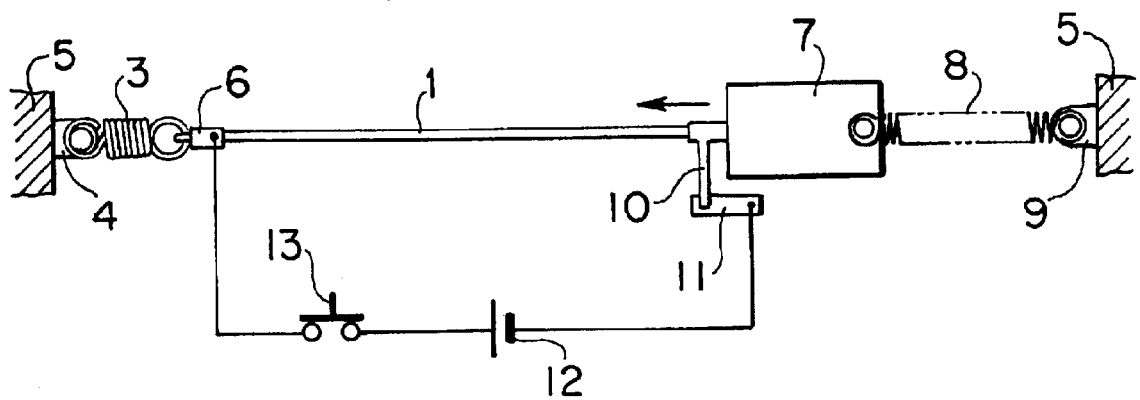
FIG. 7 is a view of an embodiment of the shape memory alloy actuator in accordance with the present invention.
Figure 8:
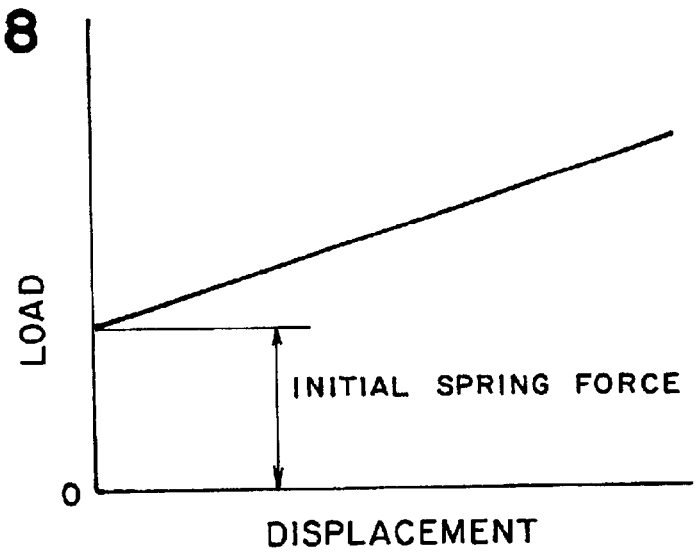
FIG. 8 is a graph depicting the characteristic of a stress-limiting spring in the embodiment of FIG. 7.

FIG. 7 shows one embodiment of the actuator in accordance with the present invention. A stress-limiting spring 3, which constitutes stress-limiting means in this embodiment, is an extension coil spring formed of an ordinary metallic material that is a non-shape memory alloy, and is attached at one end to an actuator main body 5 by means of a retainer 4. This stress-limiting spring 3 has the property of exhibiting an initial tensile spring force (initial tensile force) in its initial state, namely, the state in which no external force is applied thereto and the displacement thereof is zero, as shown in FIG. 8. At its other end the stress-limiting spring 3 is attached to one end of a shape memory alloy 1 in the form of a wire by means of a connector 6. The shape memory alloy 1, which is a Ti—Ni or Ti—Ni—Cu based shape memory alloy that is fabricated by a method the applicant disclosed in the aforementioned U.S. patent application Ser. No. 09/871,619 and that exhibits a huge two-way shape memory effect, remembers a length shorter than that illustrated in FIG. 7. At its other end the shape memory alloy 1 is attached to one end of a drive-end member 7 that is movable along a direction parallel to the direction along which the shape memory alloy 1 is extending. To the other end of the operational-end member 7, a biasing spring 8, an extension coil spring formed of an ordinary metallic material that is a non-shape memory alloy is attached at one end thereof. At its other end the biasing spring 8 is attached to the actuator main body 5 on the opposite side to the retainer 4 by means of a retainer 9. The biasing spring 8 biases the shape memory alloy 1 via the drive-end member 7 so as to stretch it. This actuator is to drive a load (not shown) via the drive-end member 7.

An electric contact brush 10 mounted on the drive-end member 7 is electrically connected with the shape memory alloy 1 at the drive-end member 7 side end thereof and slidably contacted with an electric conductor 11, which is fixed to the actuator main body 5 and extends parallel to the direction in which the shape memory alloy 1 extends. The electric contact brush 10 and the conductor 11 function as a limit switch (sensor) and constitute strain-limiting means in this embodiment. The conductor 11 is electrically connected with one terminal of a power source 12, of which other terminal is electrically connected with the shape memory alloy 1 at the stress-limiting spring 3 side end via a switch 13.

To make this embodiment easily understood, for convenience's sake, first, assuming that the actuator of this embodiment has been designed properly, the basic operation of the actuator will be explained. When the switch 13 is turned on, a current flows through the path, the power source 12-conductor 11-electric contact brush 10-shape memory alloy 1-switch 13-power source 12, and the shape memory alloy 1 is heated to the transformation temperature range by Joule heat and contracts or shortens in length against the biasing spring 8 attempting to revert to its original length, and consequently the drive-end member 7 is moved to the left in FIG. 7. On the other hand, when the switch 13 is turned off, the shape memory alloy 1 is deenergized, cooling and coming to relax to tend to cause an elongation deformation by itself while the biasing spring 8 applies a tensile force thereto; consequently it undergoes an elongation deformation and the drive-end member 7 is moved to the right in FIG. 7. Thereafter, each time the switch 13 is turned on and off, the shape memory alloy 1 undergoes a contraction and an elongation and the drive-end member 7 performs reciprocating motions horizontally in FIG. 7.

Now, the design method of this embodiment will be described below. Here the operating range of the shape memory alloy 1 is determined using the stress-strain diagram of FIG. 9 that is simplified in the same manner as FIG. 4. That is to say, the operating range of the shape memory alloy 1 is considered to be the region surrounded by the line on which the stress is zero, the straight line by which the steeper gradient portion $D_2$ is approximated, the practical stress limit line and the strain limit line near shape recovery completion, namely, the area shadowed with slanted lines in the same direction.

The specific value for the practical stress limit line, namely, the practical stress limit value, is determined according to the service life required for the actuator, on basis of life data from basic experiments that are taken place beforehand. The initial tensile spring force (initial tensile force) of the stress-limiting spring 3 is set to the magnitude corresponding to the practical stress limit value predetermined as above. With this arrangement, when the stress applied to the shape memory alloy 1 is not larger than the practical stress limit value, since the stress-limiting spring 3 is remained unexpanded and the connection between the shape memory alloy 1 and the stress-limiting spring 3 stays still relative to the actuator main body 5, the actuator operates as mentioned before. On the other hand, when the stress applied to the shape memory alloy 1 is about to exceed the practical stress limit value, the stress-limiting spring 3 is expanded, and as a consequence, the stress applied to the shape memory alloy is prevented from exceeding the practical stress limit value. This confines the operating range of the shape memory alloy 1 to the region below the practical stress limit line in FIG. 9. In the case where it is obvious that the stress applied to the shape memory alloy 1 does not exceed the practical stress limit line in view of the magnitude of the expected load to the drive-end member 7 or the like, the stress-limiting means such as the stress-limiting spring 3 can be dispensed with.

The value of the strain limit line near shape recovery completion is determined, in the temperature-strain diagram of the shape memory alloy as shown in FIG. 5, to be the point at which the gradient of the curve upon heating decreases rapidly (the point corresponding to the temperature $T_1$). The relative position between the electric contact brush 10 and the conductor 11 is established so that the electric contact brush 10 separates from the conductor 11 when the shape memory alloy 1 recovers its configuration to the strain limit line near shape recovery completion. With this arrangement, while the shape memory alloy 1 does not yet recover its configuration to the strain limit line near shape recovery completion, the electric contact brush 10 contacts with the conductor 11, whereby the actuator operates as mentioned before, but when the shape memory alloy 1 recovers its configuration to the strain limit line near shape recovery completion, the electric contact brush 10 separates from the conductor 11 to interrupt the application of the current and hence the heat to the shape memory alloy 1, and, as a result, the shape recovery of the shape memory alloy 1 is suspended. This confines the operating range of the shape memory alloy 1 to the region to the right of the strain limit line near shape recovery completion in FIG. 9.

Figure 9:
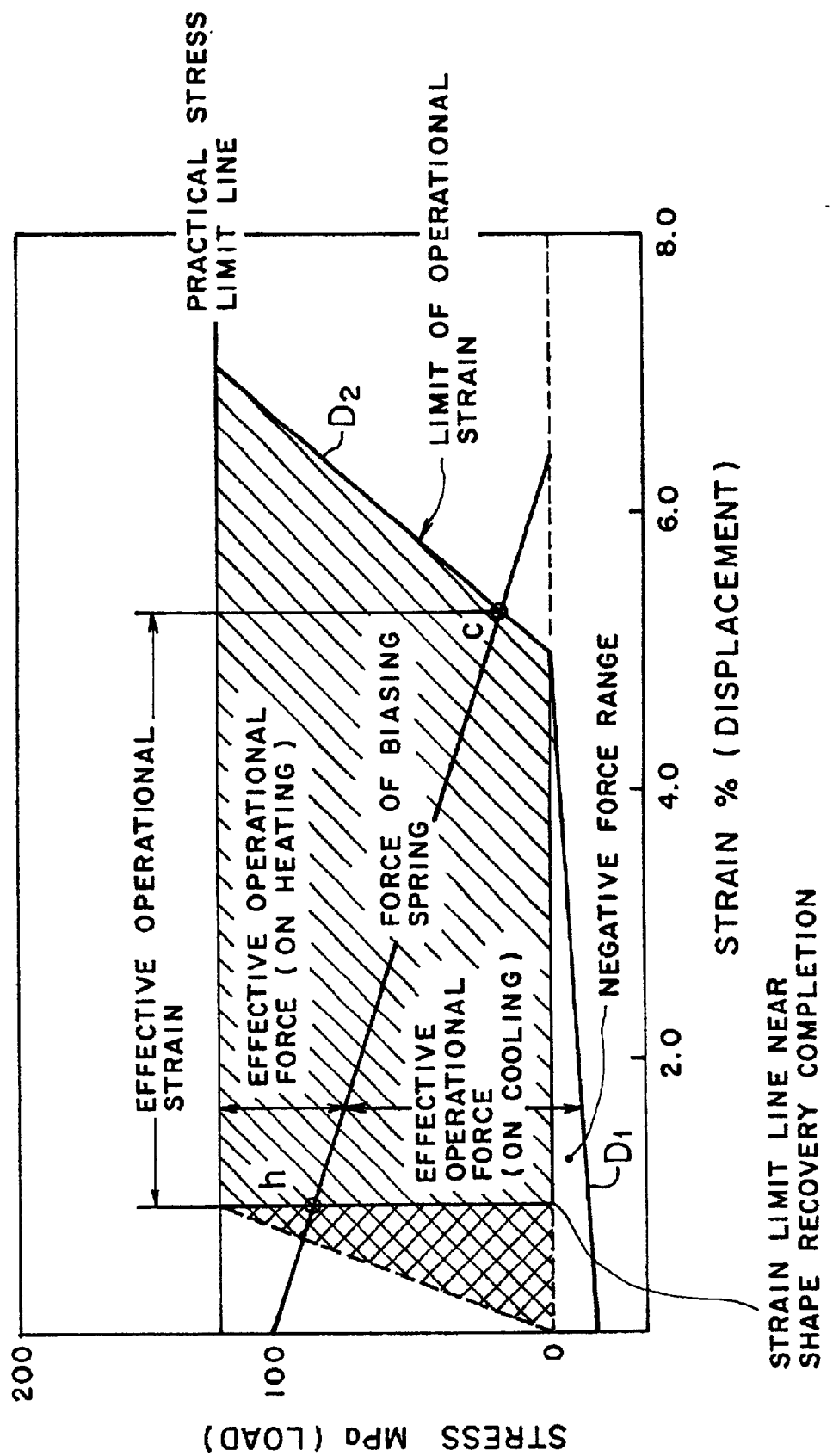
FIG. 9 is a stress-strain diagram showing the method of designing a shape memory alloy actuator in the embodiment of FIG. 7.

Next, the setting of the biasing spring 8 will be described below. Superimposing the stress-strain (force-displacement) diagram of the biasing spring 8 on that of the shape memory alloy 1, the spring constant (the slope of the stress-strain line) and the magnitude of the force at a specific displacement of the biasing spring 8 are determined so that the stress-strain line of the biasing spring 8 crosses the operating range of the shape memory alloy 1. For example, when the spring constant and the force magnitude at the specific displacement are established as illustrated in FIG. 9, if no external force is applied to the drive-end member 7, since the force of the shape memory alloy 1 at a low temperature tending to deform the biasing spring 8 is zero at most, the drive-end member 7 is moved to the intersection point c of the rising of the stress-strain curve of the shape memory alloy 1 at a low temperature and the line of the biasing spring 8. The actuator is stabilized under this condition at a low temperature, and the intersection point c becomes the origin point of the actuator operation. When the shape memory alloy 1 is heated to a high temperature, it is considered that the drive-end member 7 is moved to the intersection point h of the line of the biasing spring 8 and the strain limit line near shape recovery completion, since the shape restoring force of the shape memory alloy 1 exceeds the force of the biasing spring 8.

Thus by making the line of the biasing spring 8 cross the strain limit line near shape recovery completion and the steeper gradient portion $D_2$ of the stress-strain curve, almost the whole range of the operational strain (displacement) can be utilized as the effective operational strain of the actuator. The difference between the practical stress limit line and the line of the biasing spring 8 is the effective operational force of the actuator upon heating, while that between the line of the biasing spring 8 and the gentler portion $D_1$ of the stress-strain curve of the shape memory alloy 1 is the effective operational force of the actuator upon cooling. Accordingly, it is possible to determine the characteristic of the biasing spring 8, considering the required effective operational forces upon heating and cooling. As will be evident from FIG. 9, in extreme cases, even if using a weak spring, as the biasing spring 8, of which characteristic line is close to the line on which the stress is zero in FIG. 9 so that there is little biasing force, an actuator that performs reciprocating motions can be obtained. In this case, the shape restoring force can be fully extracted but the effective operational force upon cooling is near zero. Thus, in the case where any actuator will do, so long as it performs movement, the biasing force is not necessary. It should also be noted that lowering the practical stress limit line in order to extend the life-time of the actuator changes the amount of the operational displacement only slightly. Besides, if a little stronger biasing force is employed, the transformation point of the shape memory alloy 1 may be raised and the biasing force can be used effectively for the motion in the opposite direction upon cooling. The line of the biasing spring 8 may cross the practical stress limit line, but, in that case, the effective operational strain of the actuator is decreased.

Figure 20:
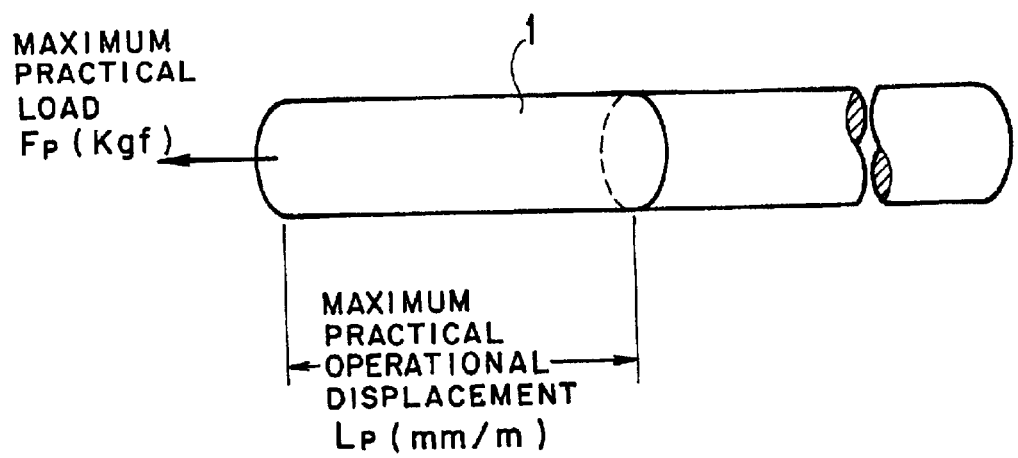
FIG. 20 is an explanatory drawing showing an approximate estimation of the maximum practical work load of the two-way shape memory alloy per stroke and the required amount of the shape memory alloy.

Application of such a design method in accordance with the present invention also makes it very easy to estimate the amount of the two-way shape memory alloy 1 required for the actuator. Since it can be considered that the motion of the shape memory alloy 1 is performed with the maximum practical stress upon heating being constant and with the minimum stress being near zero as shown in FIGS. 4 and 9, the product of the maximum practical stress and the amount of the operational strain, which is 4.5 to 5% in general, can be considered to be approximately constant for each material. Therefore, the required amount of the shape memory alloy is obtained by dividing the required output power by the product. For instance, as illustrated in FIG. 20, letting the maximum practical workload per meter of the length of the shape memory alloy in the form of a wire per stroke (one contraction) be $W_p$, the maximum practical load $F_p$, and the maximum practical operational displacement $L_p$, $$F_p = \sigma \times A$$

$$L_p = L \times \epsilon$$

$$\begin{aligned} Wp &= F_p \times L_p \text{ (kgf·mm/m)} \\ &= k \times A \times L \\ &= k \times V \end{aligned}$$

where $\sigma$ is the stress, A the cross section, L the length, $\epsilon$ the operational strain, V the volume of the shape memory alloy, and k a constant.

From the above formulas, when either the diameter or the length of the shape memory alloy 1 is determined, the remaining one can be obtained.

Figure 10:
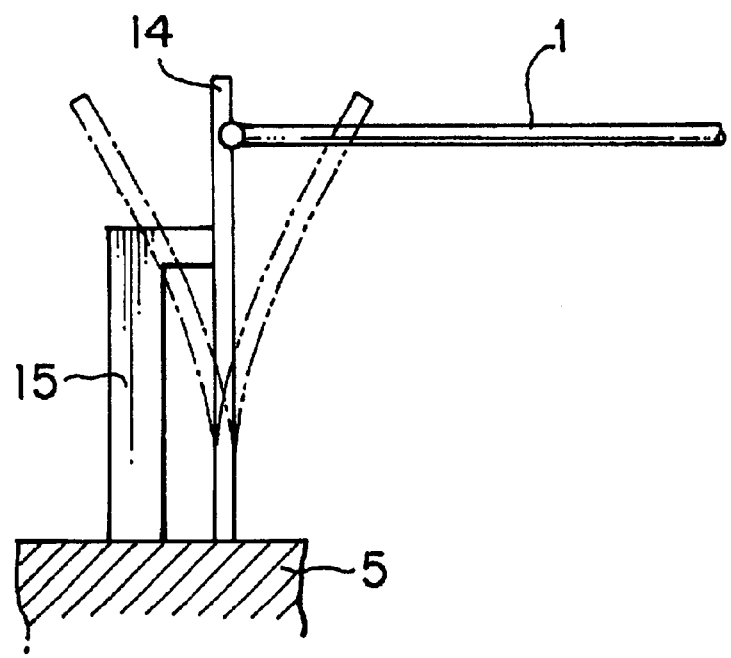
FIG. 10 is a view of another embodiment of stress-limiting means.

FIG. 10 shows another embodiment of the stress-limiting means that can be used in place of the stress-limiting spring 3 in FIG. 7. In this embodiment the stress-limiting means comprises a blade spring 14 and a stop 15, and the blade spring 14 is secured at one end to the actuator main body 5. To the other end of the blade spring 14, the shape memory alloy 1 of FIG. 7 is secured at its one end. If there were not the stop 15, in the absence of a force applied thereto from the shape memory alloy 1, the blade spring 14 bends to the left in FIG. 10 as shown by the alternate short and long dash lines but in reality it stands straight as shown by the solid lines, contacting with the stop 15. With this arrangement, the blade spring 14 possesses an initial spring force corresponding to the initial tensile force of the stress-limiting spring 3 of FIG. 7.

In this embodiment, when the stress applied to the shape memory alloy 1 is not larger than the predetermined practical strain limit value, the blade spring 14 stands straight as shown by the solid lines and the connection between the shape memory alloy 1 and the blade spring 14 stays still relative to the actuator main body 5, whereby the actuator operates normally. On the other hand, when the stress applied to the shape memory alloy 1 is about to exceed the practical strain limit value, the blade spring 14 is bent in the direction to relax the stress applied to the shape memory 1, in other words, in the bending direction opposite to that in its free state as shown by the alternate long and two short dashes lines, separating from the stop 15, and consequently the stress applied to the shape memory alloy is prevented from exceeding the practical strain limit value.

Figure 11:
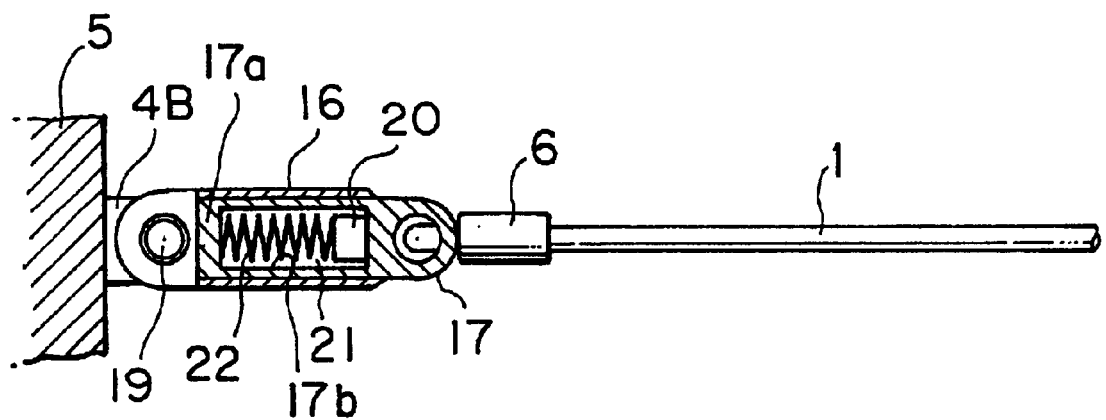
FIG. 11 is a partial cutaway view of a further embodiment of stress-limiting means.

FIG. 11 shows a further embodiment of the stress-limiting means. In this embodiment the stress-limiting means comprises an external cylindrical member 16, an internal cylindrical member 17 and a compression coil spring 22 formed of an ordinary metallic material that is a non-shape memory alloy. The external cylindrical member 17 is supported at the left end thereof in the drawing on a retainer 4B fixed to the actuator main body 5, the external cylindrical member 17 being rotatable around a rotation axis 19 provided on the retainer 4B. The internal cylindrical member 17 is fitted longitudinally slidably into the external cylindrical member 16. The shape memory alloy 1 of FIG. 7 is attached at the left end thereof to the right end in the drawing of the internal cylindrical member 17 by means of a connector 6. The compression coil spring 22 is accommodated in the internal cylindrical member 17 longitudinally, with the left end thereof abutting against the end wall 17a of the internal cylindrical member 17, and with the right end thereof abutting against a spring bearing 20 fixed to the external cylindrical member 16 so as to cross radially the interior of the external cylindrical member 16 through slits 17b formed longitudinally in the sidewall of the internal cylindrical member 17, so that the compression coil spring 22 biases the internal cylindrical member 17 in the leftward direction with respect to the external cylindrical member 16 in FIG. 11. With such arrangement, under normal operating conditions, the spring bearing 20 abuts against the right end of the slit 21, so that the internal cylindrical member 17 cannot move further in the leftward direction relative to the external cylindrical member 16 as illustrated in FIG. 11. Thus, the compression coil spring 22 possesses an initial spring force corresponding to the initial tensile force of the stress-limiting spring 3 of FIG. 7.

In this embodiment, when the stress applied to the shape memory alloy 1 is not larger than the predetermined practical strain limit value, the spring bearing 20 is pushed against the right end of the slit 21 by the restoring force of the compression coil spring 22, with the connection between the shape memory alloy 1 and the internal cylindrical member 17 staying still relative to the actuator main body 5, whereby the actuator operates normally. On the other hand, when the stress applied to the shape memory alloy 1 is about to exceed the practical strain limit value, the compression coil spring 22 is compressed further, with the connection between the shape memory alloy 1 and the internal cylindrical member 17 being moved in the rightward direction to relieve the stress applied to the shape memory alloy 1, and consequently the stress is prevented from exceeding the practical strain limit value.

Figure 12:
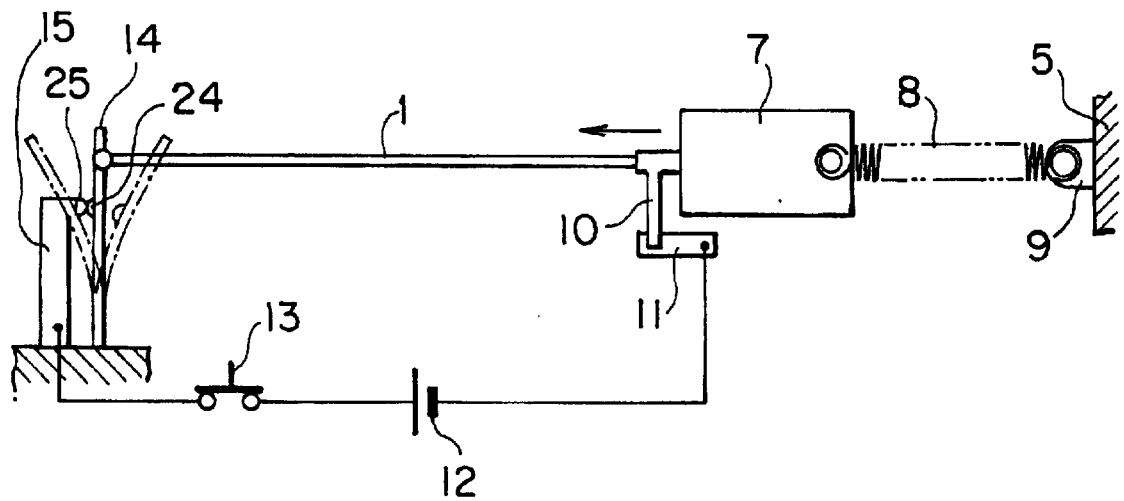
FIG. 12 is a view of another embodiment of the shape memory alloy actuator in accordance with the present invention.

FIG. 12 shows another embodiment of the shape memory alloy actuator in accordance with the present invention. In this embodiment, the stress-limiting means comprises a blade spring 14 and a stop 15 similar to those of FIG. 10, and in addition to that, the blade spring 14 is provided with a contact 24 and the stop 15 is provided with a contact 25 so that the contacts 24 and 25 contact with each other when the stress applied to the shape memory alloy 1 is not larger than the predetermined practical strain limit value. The blade spring 14 and the stop 15 possess electrical conductivity, respectively, and the contact 24 is electrically connected with the one end of the shape memory alloy 1 via the blade spring 14, while the contact 25 is electrically connected with one of the terminals of the switch 13 via the stop 15. The configuration of this embodiment is otherwise similar to that of FIG. 7.

In this embodiment, when the shape memory alloy 1 is placed under the stress not larger than the predetermined practical strain limit value, the blade spring 14 stands straight as shown by the solid lines and the connection between the shape memory alloy 1 and the blade spring 14 stays still relative to the actuator main body 5 with the contacts 24 and 25 being contact with each other, whereby the actuator operates normally. On the other hand, when the stress applied to the shape memory alloy 1 is about to exceed the practical strain limit value, the blade spring 14 is bent in the bending direction opposite to that in its free state as shown by the alternate long and two short dashes lines, separating from the stop 15, so that the connection between the shape memory alloy 1 and the blade spring 14 moves in the direction to relax the stress applied to the shape memory alloy 1 (the rightward direction in FIG. 12) and the contacts 24 and 25 separates from each other, interrupting the current to the shape memory alloy 1 to stop heating it, and consequently the stress applied to the shape memory alloy 1 is prevented from exceeding the practical strain limit value.

Figure 13:
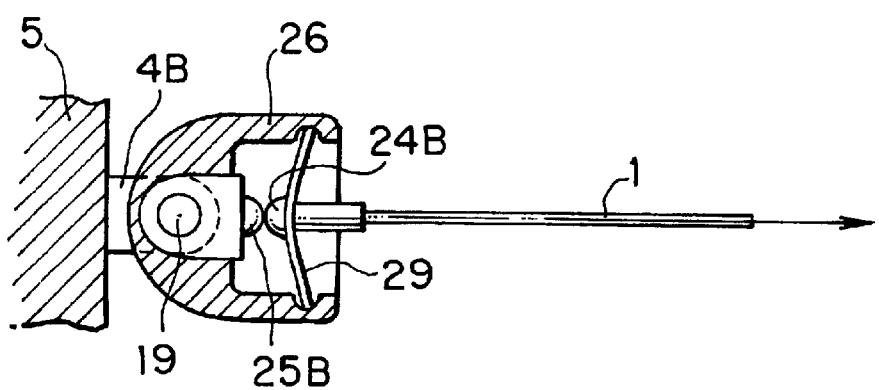
FIG. 13 is a view of another embodiment of strain-limiting means.

FIG. 13 shows another embodiment of the stress-limiting means that can be used in place of that of FIG. 12. In this embodiment, the stress-limiting means includes a generally cup-shaped spring holder 26, which is supported on a retainer 4B fixed to the actuator main body 5, rotatably around a rotation axis 19 provided on the retainer 4B. A contact 25B is fixed to the bottom of the spring holder 26. A blade spring 29 is accommodated radially in the spring holder 26, supported at both ends by the sidewall of the spring holder 26. A contact 24B is fixed to the center of the blade spring 29, which is connected with the left end of the shape memory alloy 1 of FIG. 12. The blade spring 12, in its free state, is bent more toward the rotation axis 19 than in the state as shown in the drawing, whereby it presses the contact 24B with the contact 25B with an initial spring force corresponding to the predetermined practical stress limit value for the shape memory alloy 1 when it is subjected to no force from the shape memory alloy 1. The contact 24B is electrically connected to the shape memory alloy 1 and the contact 25B is electrically connected to the switch 13 of FIG. 12.

In this embodiment, when the stress applied to the shape memory alloy 1 is not larger than the predetermined practical strain limit value, the blade spring 29 is bent so that the contacts 24 and 25 come into contact with each other with the spring force of the blade spring 29, and accordingly the actuator operates normally. On the other hand, when the stress applied to the shape memory alloy 1 is about to exceed the practical strain limit value, the bend of the blade spring 29 decreases and the connection between the shape memory alloy 1 and the blade spring 29 moves in the direction to relax the stress applied to the shape memory alloy 1 (the rightward direction in FIG. 13) and the contacts 24B and 25B separates from each other, interrupting the current to the shape memory alloy 1 to stop heating it, and consequently the stress applied to the shape memory alloy 1 is prevented from exceeding the practical strain limit value.

Figure 14:
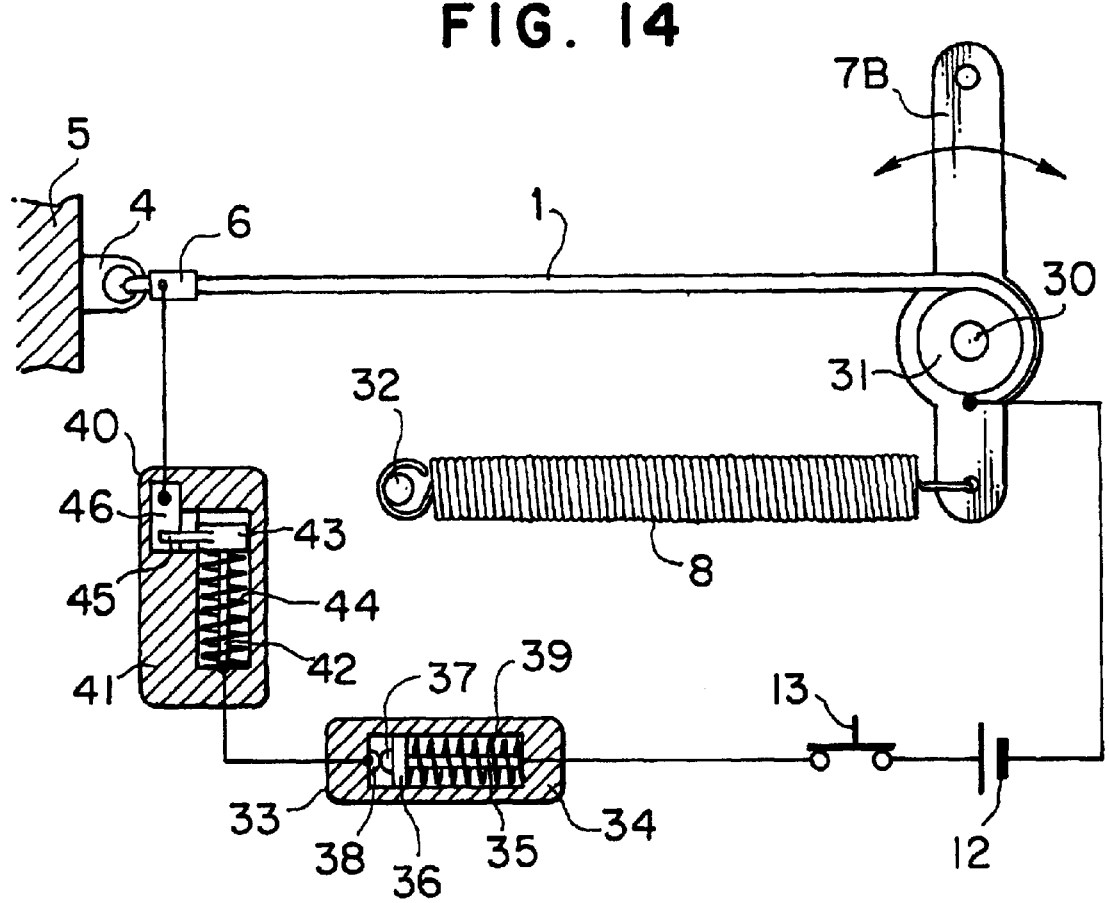
FIG. 14 is a partial cutaway view of a further embodiment of the shape memory alloy actuator in accordance with the present invention.

FIG. 14 shows a further embodiment of the shape memory alloy actuator in accordance with the present invention. A shape memory alloy 1 in the form of a wire is attached at one end, by means of the connector 6, to the retainer 4 secured to the actuator main body 5. The shape memory alloy 1 remembers a length shorter than that illustrated in the drawing. The drive-end member 7B is generally a straight arm and mounted rotatably at its mid-portion on an axis 30 erected on the actuator main body 5. A winding portion 31 having a circular cross section is integrally formed on the drive-end member 7B, coaxial with the axis 30. The shape memory alloy 1 is attached at its other end to one point at the periphery of the winding portion 31, with the portion near the end thereof being wound around the winding portion 31. A biasing spring 8, which is an extension coil spring formed of an ordinary metallic material that is a non-shape memory alloy, is interposed between a pin 32 erected on the actuator main body 5 and the one end of the drive-end member 7B so as to bias the drive-end member 7B in the direction to expand the shape memory alloy 1, namely, clockwise in the drawing. This actuator is to drive a load (not shown) via the other end (top end in the drawing) of the drive-end member 7B.

Figure 15:
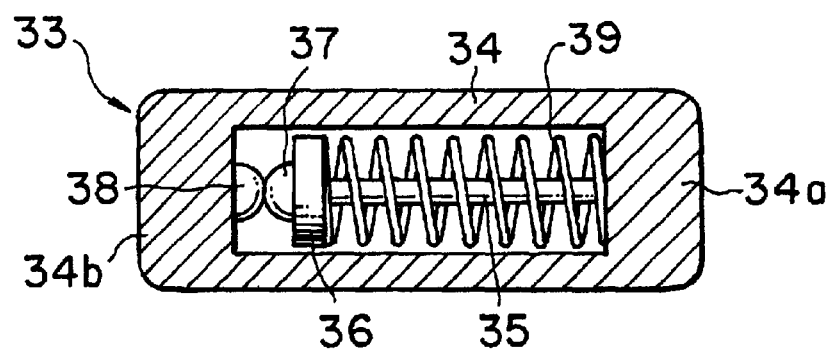
FIG. 15 is an enlarged cross sectional view of the stress-control element in the embodiment of FIG. 14.

The stress control element 33, which constitutes stress-limiting means in this embodiment, is constructed as follows (FIG. 15 shows an enlarged cross-sectional view of the stress control element 33). A reference shape memory alloy 35 in the form of a wire that is formed of the same material as the shape memory alloy 1 is accommodated in a cylindrical casing 34, attached at one end to one end wall 34a of the casing 34 and extending along the axis of the casing 34. A spring bearing 36 is secured to the other end of the reference shape memory alloy 35, and a contact 37 fixed to the spring bearing 36 is opposed to a contact 38 fixed to the other end wall 34b of the casing 34. A biasing spring 39, which is a compression coil spring formed of an ordinary metallic material that is a non-shape memory alloy, is interposed between the spring bearing 36 and the end wall 34a of the casing 34, so as to bias the reference shape memory alloy 35 to expand it and to contact the contact 37 with the contact 38. The biasing spring 39 pushes the contact 37 against the contact 38 with an initial spring force corresponding to the predetermined practical stress limit value of the shape memory alloy 1, when the reference shape memory alloy 35 is under cooled conditions. The opposite end from the spring bearing 36 of the reference shape memory alloy 35 is electrically connected with one terminal of a power source 12 via a switch 13 and the other end of the power source 12 is electrically connected with the winding portion 31 side end of the shape memory alloy 1.

Figure 16:
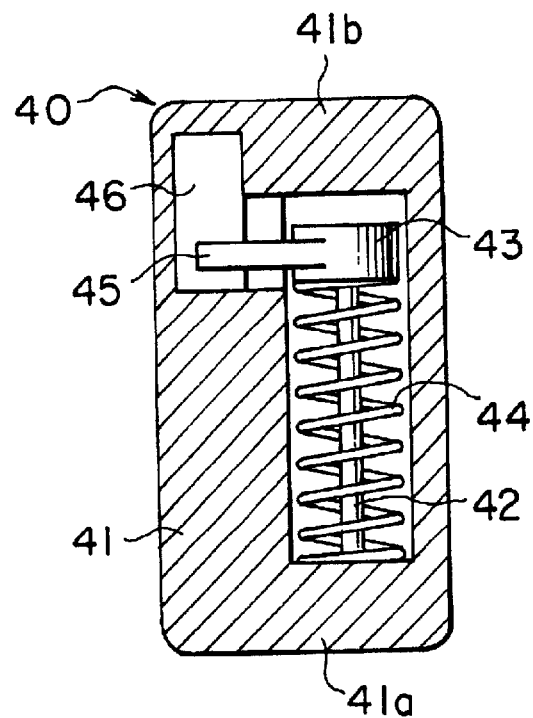
FIG. 16 is an enlarged cross sectional view of the strain-control element in the embodiment of FIG. 14.

A strain-control element 40, which constitutes strain-limiting means in this embodiment, is constructed as follows (FIG. 16 shows an enlarged cross-sectional view of the strain-control element 40). A reference shape memory alloy 42 in the form of a wire that is formed of the same material as the shape memory alloy 1 is accommodated in a casing 41, attached at one end to one end wall 41a of the casing 41, electrically connected with the contact 38 of the stress control element 33, and extending along the longitudinal direction of the casing 41. A brush support 43 is attached on the other end of the reference shape memory alloy 42. A biasing spring 44, which is a compression coil spring formed of an ordinary metallic material that is a non-shape memory alloy, is interposed between the brush support 43 and the end wall 41a so as to bias the reference shape memory alloy 42 to expand it. An electric contact brush 45 mounted on the brush support 43 and electrically connected with the reference shape memory alloy 42 via the brush support 43 is slidably contacted with an electric conductor 46. The electric conductor 46 is fixed in the casing 41, extending parallel to the reference shape memory alloy 42 and electrically connected with the retainer 4 side end of the shape memory alloy 1.

To facilitate the understanding of this embodiment, for convenience's sake, first, assuming that the actuator of this embodiment has been designed properly, the basic operation of the actuator will be explained. When the switch 13 is turned on, a current flows through the path, the power source 12-shape memory alloy 1-conductor 46 of strain-control element 40-electric contact brush 45-reference shape memory alloy 42-contact 38 of stress control element 33-contact 37-reference shape memory alloy 35-switch 13-power source 12, the shape memory alloy 1 is heated to the transformation temperature range by Joule heat and contracts attempting to revert to its original length, whereby the drive-end member 7B is rotated counterclockwise in FIG. 14. On the other hand, when the switch 13 is turned off, the shape memory alloy 1 is deenergized, cooled and comes to relax to tend to cause an elongation deformation by itself, while the biasing spring 8 applies a tensile force thereto; consequently it undergoes an elongation deformation and the drive-end member 7B is rotated clockwise in FIG. 14. Thereafter, each time the switch 13 is turned on and off, the shape memory alloy 1 undergoes a contraction and expansion and the drive-end member 7B performs reciprocating motions clockwise and counterclockwise in FIG. 14.

In this embodiment, the design of actuator can be achieved, using the stress-strain diagram as shown in FIG. 9, in much the same way as the embodiment of FIG. 7. Besides, in this embodiment, since the shape memory alloy 1, the reference shape memory alloy 35 of the stress control element 33 and the reference shape memory alloy 42 of the strain-control element 40 are connected in series, the same current passes through each of the shape memory alloys 1, 35 and 42. Therefore, if the initial spring force of the biasing spring 39 of the stress control element 33 is set properly, when the shape memory alloy 1 comes into the condition where its stress reaches the practical stress limit, the reference shape memory alloy 35 comes into a heated condition similar to that of the shape memory alloy 1 and the contacts 37 and 38 are separated from each other by the shape restoring force of the reference shape memory alloy 35, interrupting the current to the shape memory alloy 1 to stop heating it, and consequently the stress in the shape memory alloy 1 is prevented from exceeding the practical stress limit. Similarly, if the position at which the electric contact brush 45 separates from the conductor 46 is set properly, when the shape memory alloy 1 performs shape recovery to the predetermined value of the strain limit line near shape recovery completion, the electric contact brush 45 separates from the conductor 46, interrupting the current to the shape memory alloy 1 to stop heating it, and consequently the shape recovery of the shape memory alloy 1 is interrupted. Thus, in this embodiment, by means of the stress control element 33 and the strain-control element 40, the stress and the strain near the shape recovery completion of the shape memory alloy 1 for driving a load can be controlled via electric current. The elements 33 and 40 are particularly useful when it is difficult to install the stress-limiting means and the strain-limiting means that are directly and mechanically linked to the shape memory alloy 1 for driving the load.

Figure 17:
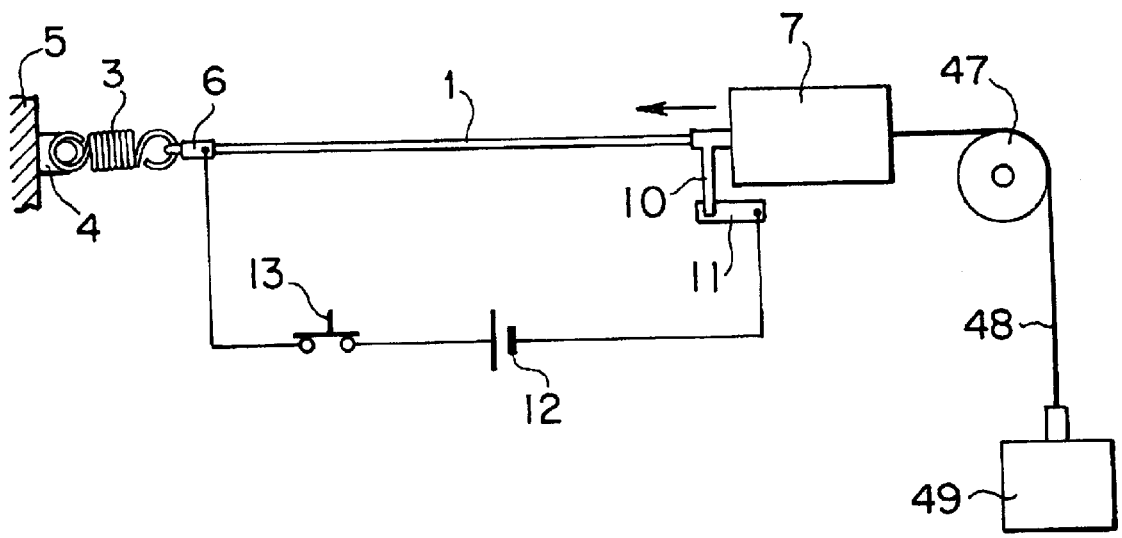
FIG. 17 is a view of a still further embodiment of the shape memory alloy actuator in accordance with the present invention.

FIG. 17 shows a still further embodiment of the shape memory alloy actuator in accordance with the present invention. This embodiment is an example in which gravity is utilized as a biasing force. A thread 48 is attached at one end to the drive-end member 7 and is wound around a pulley 47 that is rotatably mounted on an actuator main body 5. A weight 49, attached to the other end of the thread 48, is suspended by the thread 48. The configuration of this embodiment is similar to that of FIG. 7 except that gravity is utilized as biasing means, instead of the biasing spring 8, as stated above.

To facilitate the understanding of this embodiment, for convenience's sake, first, assuming that the actuator of this embodiment has been designed properly, the basic operation of the actuator will be explained. When the switch 13 is turned on, electric current is established through the shape memory alloy 1, which is heated and contracts against the gravity of the weight 49 attempting to revert to its original length, whereby the drive-end member 7 is moved to the left in FIG. 17. On the other hand, when the switch 13 is turned off, the shape memory alloy 1 is electrically deenergized, cooled and comes to relax to tend to cause an elongation deformation by itself, while the weight 49 applies a tensile force thereto; consequently it undergoes an elongation deformation and the drive-end member 7 is moved to the right in FIG. 17. Thereafter, each time the switch 13 is turned on and off, the shape memory alloy 1 undergoes a contraction and expansion and the drive-end member 7 performs reciprocating motions horizontally in FIG. 17.

Figure 18:
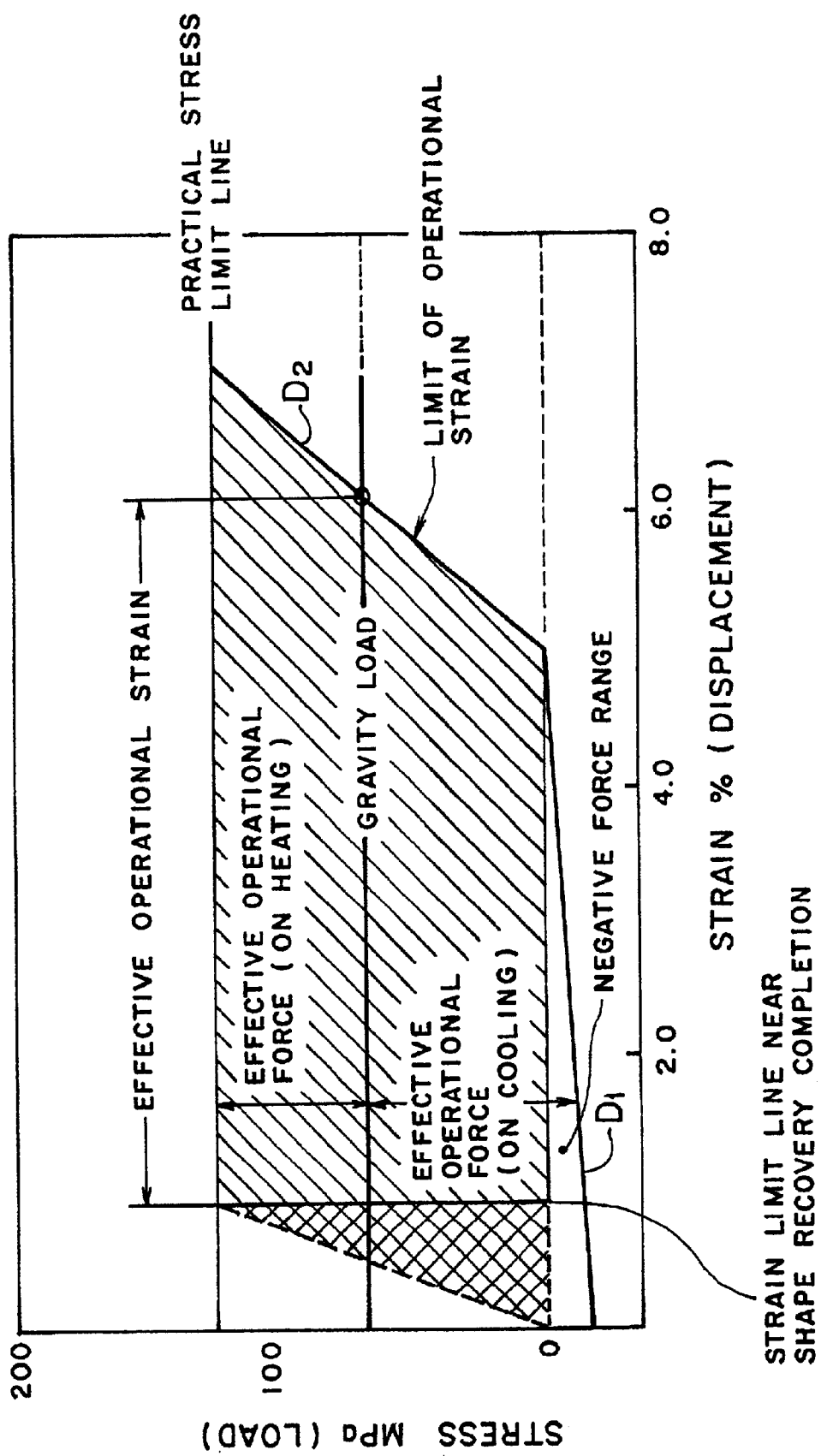
FIG. 18 is a stress-strain diagram showing the method of designing a shape memory alloy actuator in the embodiment of FIG. 17.

The design method of this embodiment will be described below. In this embodiment, the operating range of the shape memory alloy 1 is determined using the stress-strain diagram of FIG. 18 that is simplified in the same manner as FIGS. 4 and 9, and the practical stress limit line and the strain limit line near shape recovery completion are established in the same manner as in FIG. 9. Next, superimposing the line representing the gravity of the weight 49 on the stress-strain (force-displacement) diagram of the shape memory alloy 1, the weight of the weight 49 is determined so that the line representing gravity crosses the operating range of the shape memory alloy 1. Because the line representing gravity extends horizontally in FIG. 17, the actuator undergoes little change in operational force with a change in the operational displacement of the shape memory alloy 1. Setting the biasing force by means of the weight 49 to be half of the practical stress limit makes it possible to provide an actuator that can generate forces of the same magnitude in either direction, namely, upon heating and cooling, over almost the whole range of the actuator operation. The stress-limiting spring 3 (stress-limiting means) and the electric contact brush 10 and the conductor 11 (strain-limiting means) function in manners similar to the embodiment of FIG. 7, respectively.

In the present invention, the stress-limiting means and the strain-limiting means may be of types other than those in the above embodiments. Obviously, the switch and the electric contact brush may be replaced with an electronic sensor or a semiconductor.

Biasing means in the present invention is not restricted to those in the above embodiments and may be of any type as long as its characteristic curve crosses the operating range of the shape memory alloy and large displacements are available. A combination of two shape memory alloys performing motions in opposite directions with each other also may be used.

While, in the above embodiments, the shape memory alloy is in the form a wire, the shape memory alloys in the present invention can be in other forms such as a coil, a plate, etc.

The mechanism for linking the shape memory alloy to the drive-end of the actuator is not restricted to those in the above embodiments.

Although preferred embodiments of the present invention have been shown and described herein, it should be apparent that the present disclosure is made by way of example only and that variations thereto are possible within the scope of the disclosure without departing from the subject matter coming within the scope of the following claims and a reasonable equivalency thereof.

What is claimed is:

1. A method of designing a shape memory alloy actuator, using a shape memory alloy exhibiting a two-way shape memory effect and having a stress-strain property that, in a stress-strain diagram with the stress plotted in ordinate, the upward direction taken as the positive direction, and the strain plotted in abscissa, the rightward direction taken as the positive direction, the stress-strain curve at a low temperature comprises a gentler gradient portion extending from the position at which the strain is zero to the right with relatively small gradients, in the area in which the stress is negative or approximately along the line on which the stress is zero, and a steeper gradient portion extending upward to the right with relatively great gradients on the right of said gentler portion, the method comprising the step of:

setting said shape memory alloy to be operated in the region surrounded by said gentler gradient portion, said steeper gradient portion, a practical stress limit line on which the stress in said shape memory alloy reaches a specified practical limit, a straight line connecting the intersection of said practical stress limit line and a strain limit line near shape recovery completion on which the strain of said shape memory alloy reaches a specified value in a state close to the shape recovery completion and the point where the strain is zero at a low temperature in said stress-strain diagram.

2. A method of designing a shape memory alloy actuator as set forth in claim 1, comprising setting said shape memory alloy to be operated in the region surrounded by said gentler gradient portion, said steeper gradient portion, said practical stress limit line and said strain limit line near shape recovery completion in said stress-strain diagram.

3. A method of designing a shape memory alloy actuator as set forth in claim 2, wherein the region in which said shape memory alloy is to be operated is simplified down to the region surrounded by the line on which the stress is zero, a straight line by which said steeper gradient portion is approximated, said practical stress limit line and said strain limit line near shape recovery completion in said stress-strain diagram.

4. A method of designing a shape memory alloy actuator as set forth in claim 1, wherein the region in which said shape memory alloy is to be operated is simplified down to the region surrounded by the line on which the stress is zero, a straight line by which said steeper gradient portion is approximated, said practical stress limit line, and the straight line connecting the intersection of said practical stress limit line and said strain limit line near shape recovery completion and the point where the stress and the strain are zero in said stress-strain diagram.

5. A method of designing a shape memory alloy actuator as set forth in claim 1, wherein said shape memory alloy exhibits a two-way shape memory effect with a strain of 2% or more in tensile strain equivalent.

6. A method of designing a shape memory alloy actuator as set forth in claim 1, wherein said shape memory alloy exhibits a two-way shape memory effect over almost the whole range in which the strain is recoverable.

7. A method of designing a shape memory alloy actuator as set forth in claim 1 further comprising the step of:
providing biasing means for biasing said shape memory alloy in a direction to impart a deformation thereto so that a line representing characteristics of said biasing means crosses said region in which said shape memory alloy is operated in said stress-strain diagram.

8. A method of designing a shape memory alloy actuator as set forth in claim 7, wherein, said line representing characteristics of said biasing means is made to cross said steeper gradient portion and said strain limit line near shape recovery completion.

9. A shape memory alloy actuator comprising:
a shape memory alloy exhibiting a two-way shape memory effect and having a stress-strain property that, in a stress-strain diagram with the stress plotted in ordinate, the upward direction taken as the positive direction, and the strain plotted in abscissa, the rightward direction taken as the positive direction, the stress-strain curve at a low temperature comprises a gentler gradient portion extending from the position at which the strain is zero to the right with relatively small gradients, in the area in which the stress is negative or approximately along the line on which the stress is zero, and a steeper gradient portion extending upward to the right with relatively great gradients on the right of said gentler portion;
said shape memory alloy being operated in the region surrounded by said gentler gradient portion, said steeper gradient portion, a practical stress limit line on which the stress in said shape memory alloy reaches a specified practical limit, a straight line connecting the intersection of said practical stress limit line and a strain limit line near shape recovery completion on which the strain of said shape memory alloy reaches a specified value in a state close to the shape recovery completion and the point where the strain is zero at a low temperature in said stress-strain diagram.

10. A shape memory alloy actuator as set forth in claim 9, wherein said shape memory alloy is operated in the region surrounded by said gentler gradient portion, said steeper gradient portion, said practical stress limit line and said strain limit line near shape recovery completion in said stress-strain diagram.

11. A shape memory alloy actuator as set forth in claim 9, wherein said shape memory alloy exhibits a two-way shape memory effect with a strain of 2% or more in tensile strain equivalent.

12. A shape memory alloy actuator as set forth in claim 9, wherein said shape memory alloy exhibits a two-way shape memory effect over almost the whole range in which the strain is recoverable.

13. A shape memory alloy actuator as set forth in claim 9 further comprising biasing means for biasing said shape memory alloy in a direction to impart a deformation thereto, a line representing characteristics of said biasing means crossing said region where said shape memory alloy is operated in said stress-strain diagram.

14. A shape memory alloy actuator as set forth in claim 13, wherein in said stress-strain diagram said line representing characteristics of said biasing means crosses said steeper gradient portion and said strain limit line near shape recovery completion.

15. A shape memory alloy actuator as set forth in claim 9, further comprising stress-limiting means for preventing the stress in said shape memory alloy from exceeding said practical limit.

16. A shape memory alloy actuator as set forth in claim 15, wherein said stress-limiting means comprises an alloy supporting member for supporting said shape memory alloy, said alloy supporting member being displaced in a direction to relieve the stress in said shape memory alloy when the stress is about to exceed said practical limit.

17. A shape memory alloy actuator as set forth in claim 16, wherein said alloy supporting member has elasticity and is deformed in the direction to relieve the stress in said shape memory alloy when the stress is about to exceed said practical limit.

18. A shape memory alloy actuator as set forth in claim 16, wherein said stress-limiting means comprises a spring that normally holds said alloy supporting member at a predetermined position, while allowing said alloy supporting member to displace from said predetermined position in the direction to relieve the stress in said shape memory alloy when the stress is about to exceed said practical limit.

19. A shape memory alloy actuator as set forth in claim 15, wherein said shape memory alloy is driven by an electric current passed therethrough and said stress-limiting means interrupts the current to said shape memory alloy when the stress in said shape memory alloy is about to exceed said practical limit.

20. A shape memory alloy actuator as set forth in claim 19, wherein said stress-limiting means comprises a reference shape memory alloy that carries an electric current in common with said shape memory alloy operated in said region and said stress-limiting means interrupts the electric current to said shape memory alloy operated in said region when the stress in said reference shape memory alloy is about to exceed a predetermined value corresponding to said practical limit.

21. A shape memory alloy actuator as set forth in claim 9, further comprising strain-limiting means that prevents said shape memory alloy from performing shape recovery beyond said strain limit line near shape recovery completion.

22. A shape memory alloy actuator as set forth in claim 21, wherein said shape memory alloy is driven by an electric current passed therethrough and said strain-limiting means interrupts the electric current to said shape memory alloy when said shape memory alloy is about to perform shape recovery more than a determined level.

23. A shape memory alloy actuator as set forth in claim 22, wherein said strain-limiting means comprises a reference shape memory alloy that carries an electric current in common with said shape memory alloy operated in said region and said strain-limiting means interrupts the electric current to said shape memory alloy operated in said region when said reference shape memory alloy is about to perform shape recovery more than a determined level.

* * * * *